(12) United States Patent
Zarakas et al.

(10) Patent No.: US 11,640,467 B2
(45) Date of Patent: *May 2, 2023

(54) SYSTEM AND METHODS FOR SECURE FIRMWARE VALIDATION

(71) Applicant: Capital One Services, LLC, McLean, VA (US)

(72) Inventors: James Zarakas, Centreville, VA (US); David Wurmfeld, Falls Church, VA (US); Brennon York, San Francisco, CA (US); Tyler Locke, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/085,076

(22) Filed: Oct. 30, 2020

(65) Prior Publication Data

US 2021/0049279 A1 Feb. 18, 2021

Related U.S. Application Data

(63) Continuation of application No. 16/591,663, filed on Oct. 3, 2019, now Pat. No. 10,839,081, which is a
(Continued)

(51) Int. Cl.
*G06F 21/57* (2013.01)
*G06F 8/654* (2018.01)
(Continued)

(52) U.S. Cl.
CPC ............ *G06F 21/572* (2013.01); *G06F 8/654* (2018.02); *G06F 21/77* (2013.01); *G06F 21/86* (2013.01);
(Continued)

(58) Field of Classification Search
CPC ........ G06F 8/654; G06F 21/572; G06F 21/77; G06F 21/86; G06F 21/72;
(Continued)

(56) References Cited

U.S. PATENT DOCUMENTS

| 5,877,547 A | 3/1999 | Rhelimi |
| 5,940,510 A | 8/1999 | Curry et al. |

(Continued)

FOREIGN PATENT DOCUMENTS

| CN | 102413442 B | 1/2015 | |
| DE | 60223890 T2 * | 4/2008 | ............... G06F 8/65 |

(Continued)

OTHER PUBLICATIONS

Ayad et al., "An Authentication Method for Secure Internet Transaction Using Smart Card and Secure Coprocessor", Jun. 2003, Jurnal Teknologi, pp. 103-124 (Year: 2003).*
(Continued)

*Primary Examiner* — Wei Y Zhen
*Assistant Examiner* — Junchun Wu
(74) *Attorney, Agent, or Firm* — Troutman Pepper Hamilton Sanders LLP; Christopher J. Forstner; John A. Morrissett

(57) ABSTRACT

An electronic device, such as a dynamic transaction card having a chip, an applet, and a cryptographic coprocessor performs secure firmware and/or software updates, and performs firmware and/or software validation for firmware and/or software that is stored on the electronic device. Validation may compare a calculated checksum with a checksum stored in the device. If a checksum calculated for a firmware and/or a software application matches a stored checksum, the transaction card may operate normally. If a checksum calculated for a firmware and/or a software application does not match the stored checksum, the transaction
(Continued)

card may freeze all capabilities, erase the memory of the transaction card, display data indicative of fraud, and/or the like.

20 Claims, 8 Drawing Sheets

Related U.S. Application Data continuation of application No. 15/944,741, filed on Apr. 3, 2018, now Pat. No. 10,509,908, which is a continuation of application No. 15/099,048, filed on Apr. 14, 2016, now Pat. No. 9,965,632.

(60) Provisional application No. 62/305,850, filed on Mar. 9, 2016, provisional application No. 62/270,465, filed on Dec. 21, 2015, provisional application No. 62/147,568, filed on Apr. 14, 2015.

(51) Int. Cl.
*H01L 23/00* (2006.01)
*G06F 21/86* (2013.01)
*G06K 19/073* (2006.01)
*G06F 21/77* (2013.01)
*G06F 21/72* (2013.01)

(52) U.S. Cl.
CPC ........ *G06K 19/07381* (2013.01); *H01L 23/57* (2013.01); *G06F 21/72* (2013.01); *G06F 2221/033* (2013.01); *G06F 2221/2143* (2013.01); *G06F 2221/2153* (2013.01)

(58) Field of Classification Search
CPC ....... G06F 2221/033; G06F 2221/2143; G06F 2221/2153; G06K 19/07381; H01L 23/57
See application file for complete search history.

(56) References Cited

U.S. PATENT DOCUMENTS

| | | | |
|---|---|---|---|
| 5,949,880 A | 9/1999 | Curry et al. | |
| 6,105,013 A | 8/2000 | Curry et al. | |
| 6,237,095 B1 | 5/2001 | Curry et al. | |
| 7,010,625 B2 | 3/2006 | Wang et al. | |
| 7,243,853 B1 | 7/2007 | Levy et al. | |
| 7,318,550 B2 | 1/2008 | Bonalle et al. | |
| 7,480,907 B1 | 1/2009 | Marolia et al. | |
| 7,584,153 B2 | 9/2009 | Brown et al. | |
| 7,587,756 B2 | 9/2009 | Peart et al. | |
| 7,597,265 B2 | 10/2009 | Bonalle et al. | |
| 7,689,981 B1 | 3/2010 | Gustafson | |
| 7,729,986 B1 | 6/2010 | Hoffman et al. | |
| 7,784,687 B2 | 8/2010 | Mullen et al. | |
| 7,793,845 B2 | 9/2010 | Bonalle et al. | |
| 7,793,851 B2 | 9/2010 | Mullen | |
| 7,798,415 B1 | 9/2010 | Bates et al. | |
| 7,815,126 B2 | 10/2010 | Top | |
| 7,828,220 B2 | 11/2010 | Mullen | |
| 7,870,373 B2 | 1/2011 | Rothman et al. | |
| 7,874,492 B2 | 1/2011 | Levy et al. | |
| 7,904,895 B1* | 3/2011 | Cassapakis ............. G06F 8/654 |
| | | | 717/169 |
| 7,931,195 B2 | 4/2011 | Mullen | |
| 7,946,501 B2 | 5/2011 | Borracci | |
| 7,953,671 B2 | 5/2011 | Bishop et al. | |
| 7,954,705 B2 | 6/2011 | Mullen | |
| 3,011,577 A1 | 9/2011 | Mullen et al. | |
| 3,016,191 A1 | 9/2011 | Bonalle et al. | |
| 3,019,684 A1 | 9/2011 | Hoffman et al. | |
| 3,020,775 A1 | 9/2011 | Mullen et al. | |
| 8,066,191 B1 | 11/2011 | Cloutier et al. | |
| 8,074,877 B2 | 12/2011 | Mullen et al. | |
| 8,078,532 B2 | 12/2011 | Hoffman et al. | |
| 8,082,211 B2 | 12/2011 | Hoffman et al. | |
| 8,095,113 B2 | 1/2012 | Kean et al. | |
| 8,172,148 B1 | 5/2012 | Cloutier et al. | |
| 8,196,131 B1 | 6/2012 | Von Behren et al. | |
| 8,215,563 B2 | 7/2012 | Levy et al. | |
| 8,282,007 B1 | 10/2012 | Cloutier et al. | |
| 8,286,876 B2 | 10/2012 | Mullen et al. | |
| 8,302,872 B2 | 11/2012 | Mullen | |
| 8,308,059 B2 | 11/2012 | Granuoci et al. | |
| 8,322,623 B1 | 12/2012 | Mullen et al. | |
| 8,348,172 B1 | 1/2013 | Cloutier et al. | |
| 8,360,322 B2 | 1/2013 | Bonalle et al. | |
| 8,382,000 B2 | 2/2013 | Mullen et al. | |
| 8,393,545 B1 | 3/2013 | Mullen et al. | |
| 8,393,546 B1 | 3/2013 | Yen et al. | |
| 8,413,892 B2 | 4/2013 | Mullen et al. | |
| 8,417,631 B2 | 4/2013 | Hoffman et al. | |
| 8,424,773 B2 | 4/2013 | Mullen et al. | |
| 8,429,085 B2 | 4/2013 | Faith et al. | |
| 8,429,423 B1 | 4/2013 | King et al. | |
| 8,459,548 B2 | 6/2013 | Mullen et al. | |
| 8,485,437 B2 | 7/2013 | Mullen et al. | |
| 8,485,446 B1 | 7/2013 | Mullen et al. | |
| 8,489,513 B2 | 7/2013 | Bishop et al. | |
| 8,511,574 B1 | 8/2013 | Yen et al. | |
| 8,517,276 B2 | 8/2013 | Mullen et al. | |
| 8,523,059 B1 | 9/2013 | Mullen et al. | |
| 8,561,894 B1 | 10/2013 | Mullen et al. | |
| 8,567,679 B1 | 10/2013 | Mullen et al. | |
| 8,573,503 B1 | 11/2013 | Cloutier et al. | |
| 8,579,203 B1 | 11/2013 | Lambert et al. | |
| 8,590,796 B1 | 11/2013 | Cloutier et al. | |
| 8,602,312 B2 | 12/2013 | Cloutier et al. | |
| 8,608,083 B2 | 12/2013 | Mullen et al. | |
| 8,622,309 B1 | 1/2014 | Mullen et al. | |
| 8,628,022 B1 | 1/2014 | Rhoades et al. | |
| 8,650,439 B2 | 2/2014 | Rabeler | |
| 8,668,143 B2 | 3/2014 | Mullen et al. | |
| 8,727,219 B1 | 5/2014 | Mullen | |
| 8,733,638 B2 | 5/2014 | Mullen et al. | |
| 8,746,579 B1 | 6/2014 | Cloutier et al. | |
| 8,757,483 B1 | 6/2014 | Mullen et al. | |
| 8,757,499 B2 | 6/2014 | Cloutier et al. | |
| 8,762,350 B2 | 6/2014 | Relyea | |
| 8,805,746 B2 | 8/2014 | Hoffman et al. | |
| 8,811,959 B2 | 8/2014 | Conner et al. | |
| 8,814,050 B1 | 8/2014 | Mullen et al. | |
| 8,820,638 B1 | 9/2014 | Cotter et al. | |
| 8,826,261 B1* | 9/2014 | Anand Ag ............. G06F 8/654 |
| | | | 717/173 |
| 8,827,153 B1 | 9/2014 | Rhoades et al. | |
| 8,856,771 B2 | 10/2014 | Chalmers et al. | |
| 8,870,081 B2 | 10/2014 | Olson et al. | |
| 8,875,999 B2 | 11/2014 | Mullen et al. | |
| 8,876,011 B2 | 11/2014 | Olson et al. | |
| 8,888,009 B1 | 11/2014 | Mullen | |
| 8,890,298 B2 | 11/2014 | Buer et al. | |
| 8,898,477 B2 | 11/2014 | Prevost et al. | |
| 8,910,139 B2 | 12/2014 | Li et al. | |
| 8,931,703 B1 | 1/2015 | Mullen et al. | |
| 8,944,333 B1 | 2/2015 | Mullen et al. | |
| 8,955,744 B2 | 2/2015 | Granucci et al. | |
| 8,960,545 B1 | 2/2015 | Batra | |
| 8,973,824 B2 | 3/2015 | Mullen et al. | |
| 9,123,204 B2 | 9/2015 | Rader et al. | |
| 9,134,994 B2 | 9/2015 | Patel et al. | |
| 9,576,159 B1* | 2/2017 | Templeton ............. G06Q 30/06 |
| 9,870,557 B2* | 1/2018 | Babu ..................... G06F 1/3209 |
| 9,965,632 B2* | 5/2018 | Zarakas ................. G06F 21/77 |
| 10,084,604 B2 | 9/2018 | Burghardt | |
| 2003/0007643 A1* | 1/2003 | Ben-Zur ................. H04N 7/162 |
| | | | 348/E7.056 |
| 2003/0084440 A1* | 5/2003 | Lownes .................... G06F 8/65 |
| | | | 725/50 |
| 2003/0120944 A1 | 6/2003 | Kim et al. | |
| 2005/0188366 A1 | 8/2005 | Chang | |
| 2005/0240919 A1 | 10/2005 | Kim et al. | |
| 2006/0205129 A1 | 9/2006 | Sato et al. | |

(56) References Cited

U.S. PATENT DOCUMENTS

| | | |
|---|---|---|
| 2006/0213972 A1 | 9/2006 | Kelly et al. |
| 2006/0236125 A1 | 10/2006 | Sahita et al. |
| 2007/0094493 A1 | 4/2007 | Ali et al. |
| 2007/0169073 A1 | 7/2007 | O'Neill et al. |
| 2007/0288914 A1 | 12/2007 | Brannock et al. |
| 2008/0052699 A1 | 2/2008 | Baker et al. |
| 2008/0086631 A1* | 4/2008 | Chow ............... G06F 8/654 711/E12.008 |
| 2009/0026275 A1 | 1/2009 | Tapler et al. |
| 2009/0217257 A1 | 8/2009 | Huang et al. |
| 2010/0012732 A1 | 1/2010 | Pinzinger et al. |
| 2010/0023777 A1 | 1/2010 | Prevost et al. |
| 2011/0007894 A1* | 1/2011 | Takenaka ............. G06F 7/723 380/28 |
| 2011/0022482 A1 | 1/2011 | Florek et al. |
| 2011/0022655 A1* | 1/2011 | Pinnick ............. G06Q 20/3224 709/203 |
| 2011/0080774 A1 | 4/2011 | Saito et al. |
| 2011/0173691 A1 | 7/2011 | Baba |
| 2011/0222336 A1 | 9/2011 | Kato |
| 2011/0252284 A1 | 10/2011 | Sindhu et al. |
| 2012/0109735 A1 | 5/2012 | Krawczewicz et al. |
| 2012/0144279 A1 | 6/2012 | Rabeler |
| 2012/0159148 A1 | 6/2012 | Behren et al. |
| 2012/0221859 A1 | 8/2012 | Marien et al. |
| 2012/0221860 A1 | 8/2012 | Hoornaert et al. |
| 2012/0254038 A1 | 10/2012 | Mullen |
| 2013/0013759 A1 | 1/2013 | Austen et al. |
| 2013/0119130 A1 | 5/2013 | Braams |
| 2013/0125107 A1 | 5/2013 | Bandakka et al. |
| 2013/0191288 A1 | 7/2013 | Hoffman et al. |
| 2013/0212407 A1 | 8/2013 | Walton et al. |
| 2013/0217152 A1 | 8/2013 | Mullen et al. |
| 2013/0218760 A1 | 8/2013 | Faith et al. |
| 2013/0227286 A1 | 8/2013 | Brisson |
| 2013/0268776 A1* | 10/2013 | Motoyama ............ H04L 9/0625 713/189 |
| 2013/0295902 A1 | 11/2013 | Justen et al. |
| 2013/0311363 A1 | 11/2013 | Ramaci et al. |
| 2013/0320080 A1 | 12/2013 | Olson et al. |
| 2013/0320081 A1 | 12/2013 | Olson et al. |
| 2013/0346299 A1* | 12/2013 | Grinberg ............ G06Q 20/3278 705/39 |
| 2014/0001269 A1 | 1/2014 | Hartwick et al. |
| 2014/0006277 A1 | 1/2014 | Rao |
| 2014/0019661 A1 | 1/2014 | Hormuth et al. |
| 2014/0026213 A1 | 1/2014 | Antebi et al. |
| 2014/0114861 A1 | 4/2014 | Mages et al. |
| 2014/0117094 A1 | 5/2014 | Workley et al. |
| 2014/0129435 A1 | 5/2014 | Pardo et al. |
| 2014/0138435 A1 | 5/2014 | Khalid |
| 2014/0144984 A1 | 5/2014 | Olson et al. |
| 2014/0164154 A1 | 6/2014 | Ramaci |
| 2014/0175170 A1 | 6/2014 | Bowers |
| 2014/0203902 A1 | 7/2014 | Shippee et al. |
| 2014/0210589 A1 | 7/2014 | Grace |
| 2014/0214674 A1* | 7/2014 | Narula ............... G06Q 20/4016 705/44 |
| 2014/0233166 A1 | 8/2014 | O'Shea |
| 2014/0256251 A1 | 9/2014 | Caceres et al. |
| 2014/0279476 A1 | 9/2014 | Hua |
| 2014/0279555 A1 | 9/2014 | Guillaud |
| 2014/0300983 A1 | 10/2014 | Jackson |
| 2014/0310184 A1 | 10/2014 | Hoffman et al. |
| 2014/0317611 A1 | 10/2014 | Wojcik et al. |
| 2014/0339315 A1 | 11/2014 | Ko |
| 2014/0379583 A1 | 12/2014 | Hoffman et al. |
| 2015/0004934 A1 | 1/2015 | Qian et al. |
| 2015/0006378 A1 | 1/2015 | Blythe |
| 2015/0012440 A1 | 1/2015 | Kelley et al. |
| 2015/0073983 A1 | 3/2015 | Bartenstein et al. |
| 2015/0080077 A1 | 3/2015 | Miller et al. |
| 2015/0088737 A1 | 3/2015 | Chan |
| 2015/0149992 A1 | 5/2015 | Wade et al. |
| 2015/0186131 A1* | 7/2015 | Asnaashari ........... G06F 21/572 710/13 |
| 2016/0021121 A1 | 1/2016 | Cui et al. |
| 2016/0098719 A1* | 4/2016 | Votaw ................. H04W 4/50 705/44 |
| 2016/0165010 A1 | 6/2016 | Bacovsky et al. |
| 2016/0217287 A1 | 7/2016 | Davidson et al. |
| 2016/0307190 A1 | 10/2016 | Zarakas et al. |
| 2019/0303915 A1* | 10/2019 | Hammad ............. G06F 21/34 |
| 2022/0004454 A1* | 1/2022 | Haswell ............ H03M 13/096 |

FOREIGN PATENT DOCUMENTS

| | | | |
|---|---|---|---|
| EP | 2704053 A1 | 3/2014 | |
| JP | 2007184715 A | 7/2007 | |
| JP | 2013077034 A * | 4/2013 | ............ H04L 9/003 |
| WO | 2016168457 A1 | 10/2016 | |
| WO | 2016168475 A1 | 10/2016 | |

OTHER PUBLICATIONS

Selimis et al. "Software and Hardware Issues in Smart Card Technology", 2009, IEEE, vol. 11, No. 3 (Year: 2009).*

Hoover et al., "Software Smart Cards via Cryptographic Camouflage", May 1999, IEEE (Year: 1999).*

Markantonakis, "The Case for a Secure Multi-Application Smart Card Operating System", Jun. 2005, Springer, Berlin, Heidelberg (Year: 2005).*

Sabatier et al., "The Use of the B Formal Method for the Design and the Validation of the Transaction Mechanism for Smart Card Applications", 1999, Springer-Verlag Berlin Heidelberg, vol. 1, pp. 348-368 (Year: 1999).*

Breekel, "A security evaluation and proof-of-concept relay attack on Dutch EMV contactless transactions," Oct. 2014, Eindhoven University of Technology (Year: 2014).

Extended European Search Report in related EP Application No. dated Jun. 13, 2019.

Extended European Search Report in related EP Application No. 16780753.6, dated Sep. 27, 2018.

Extended European Search Report, Application No. 17211210.4-1202, dated May 23, 2018, 9 pages.

Extended European Search Report, Application No. 17211216.1-1202, dated Jun. 4, 2018, 9 pages.

Office Action in related EP Application No. 19167689.9 dated Jun. 9, 2020 (5 pages).

Notification of Transmittal of The International Search Report and The Written Opinion of the International Searching Authority from Application No. PCT/US2016/027554 dated Jul. 14, 2016.

Markantonakis et al., "Attacking smart card systems: Theory and practice", 2009, Elsevier.

Toover et al., "Software Smart Cards via Cryptographic Camouflage", 1999, IEEE.

Zambreno et al., "SAFE-OPS: An Approach to Embedded Software Security", Feb. 2005, ACM, vol. 4, No. 1, pp. 189-210.

Bouffard et al., "Combined Software and Hardware Attacks on the Java Card Control Flow", 2011, Cardis.

* cited by examiner

SYSTEM AND METHODS FOR SECURE FIRMWARE VALIDATION

CROSS REFERENCE TO RELATED APPLICATIONS

This application is a continuation of, and claims priority under 35 U.S.C. § 120 to, U.S. patent application Ser. No. 16/591,663, filed Oct. 3, 2019, which is a continuation of U.S. patent application Ser. No. 15/944,741, now U.S. Pat. No. 10,509,908, filed Apr. 3, 2018, which is a continuation of U.S. patent application Ser. No. 15/099,048, now U.S. Pat. No. 9,965,632, filed Apr. 14, 2016, which claims the benefit of U.S. Provisional Application No. 62/305,850, entitled "Systems and Methods for Secure Firmware Updates," filed Mar. 9, 2016, U.S. Provisional Application No. 62/270,465, entitled "Device, System, Method for Firmware Validation," filed Dec. 21, 2015, and U.S. Provisional Application No. 62/147,568, entitled "A System, Method, and Apparatus for a Dynamic Transaction Card," filed Apr. 14, 2015. The entire contents of these applications are fully incorporated herein by reference.

This application is related to U.S. application Ser. No. 15/098,903, entitled "Tamper-Resistant Transaction Card and Method of Providing a Tamper-Resistant Transaction Card," filed Apr. 14, 2016, which claims the benefit of U.S. Provisional Application No. 62/270,449, filed Dec. 21, 2015; U.S. application Ser. No. 15/098,935, entitled "Dynamic Transaction Card Power Management," filed Apr. 14, 2016, which claims the benefit of U.S. Provisional Application No. 62/266,324, filed Dec. 11, 2015, U.S. Provisional Application No. 62/270,307, filed Dec. 21, 2015, and U.S. Provisional Application No. 62/305,599, filed Mar. 9, 2016; and U.S. application Ser. No. 14/977,730, entitled "System, Method, and Apparatus for Locating a Bluetooth Enabled Transaction Card," filed Dec. 22, 2015, which claims the benefit of U.S. Provisional Application No. 62/095,190, filed Dec. 22, 2014. The entire contents of these applications are incorporated herein by reference.

FIELD OF THE DISCLOSURE

The present disclosure relates to systems and methods that securely update firmware and/or software on an electronic device, such as a dynamic transaction card that may utilize an EMV chip as a Trusted Platform Module (TPM) in order to store and calculate checksums for firmware and/or application validation.

BACKGROUND OF THE DISCLOSURE

Updating firmware and/or software on an electronic device such as a dynamic transaction card may introduce potential security issues, such as the insertion of malware, spyware, and/or the like. Standard over-the-air (OTA) updates are not secure enough to ensure that malware, spyware, and/or the like are not introduced during the update.

A checksum may be used for firmware and/or software validation. However, currently when a checksum is used for software validation, the checksum storage and validation occur using the same device component (e.g., a microprocessor, microcontroller, and the like) making the checksums used for validation susceptible to security threats. Moreover, current checksum calculations typically use predefined intervals or times to run such as at boot-up, device wakeup, and/or a network connection.

These and other drawbacks exist.

SUMMARY OF THE DISCLOSURE

Various embodiments of the present disclosure provide systems and methods that securely update firmware and/or software on an electronic device, such as a dynamic transaction card including an EuroPay-MasterCard-Visa (EMV) microcontroller chip. An EMV chip may be used as a Trusted Platform Module (TPM) in order to store and calculate checksums for associated firmware and/or software validation.

As referred to herein, an EMV chip may be a secure cryptographic coprocessor such as a TPM. An EMV chip may be secured within a transaction card, such as dynamic transaction card disclosed in U.S. Provisional Application No. 62/147,568, the entire contents of which are incorporated herein. For example, an EMV chip may be a read-only microprocessor.

In the various embodiments described herein, a secure update of firmware and/or software stored on an electronic device, such as a dynamic transaction card including an EMV chip may include connecting the electronic device with a firmware/software provider system via a secure terminal connection. Once the dynamic transaction card and the POS terminal/ATM/stand-alone secure terminal have established a secure connection, the POS terminal/ATM/stand-alone secure terminal may transmit at least a portion of a firmware and/or software update via the secure connection from a backend system (e.g., a financial institution system and/or other dynamic transaction card firmware and/or software provider system) to the dynamic transaction card.

A transmission of at least a portion of a firmware and/or software update may occur during and/or at the end of a transaction, such as an EMV transaction. In this manner, the backend system (e.g., a financial institution system and/or other dynamic transaction card firmware and/or software provider system) that is involved in the transaction may transmit the firmware and/or software update portion in secure packets such as transaction tokens. A portion of a firmware and/or software update may include the entire updated firmware and/or software program, a section of the updated firmware and/or software program, a cryptographic key to decrypt a firmware and/or software update, and/or a checksum associated with the updated firmware and/or software program.

A bootloader on the dynamic transaction card may receive a boot signal from a device, such as a the secure terminal and/or a user device, use the bootloader signal to validate the bootloader and determine whether the existing firmware and/or software is valid, load the updated firmware and/or software program, and execute the updated firmware and/or software program, which overwrites the existing firmware and/or software.

If the at least a portion of the firmware and/or software update is not the entire updated firmware and/or software program, the remaining portion of the firmware and/or software update may be downloaded from a user device, such as a smart phone, tablet, computer, and/or the like, via a network, such as a Bluetooth, Bluetooth Low Energy (BLE), Near Field Communication (NFC), WiFi, and/or other wireless network that enables a connection between the transaction card and user device. The remaining portion of the firmware and/or software update also may be downloaded from a user device via a physical connection between the user device and the dynamic transaction card, such as using a portable EMV reader attached to the user device.

If the remaining portion of the firmware and/or software update downloaded from a user device is encrypted, the dynamic transaction card may decrypt it. For example, the portion of the firmware and/or software update received from the secure terminal may include a key (e.g., a private key, a public key, and/or the like) to decrypt the remaining portion received from a user device. An EMV processor may also include pre-stored keys (e.g., private keys, public keys, and/or the like) that may be used to decrypt the remaining portion of a firmware and/or software update received from a user device.

If the remaining portion of the firmware and/or software update downloaded from a user device includes a checksum associated with the firmware and/or software update, this checksum may be used to verify the firmware and/or software update. For example, a checksum may be calculated for the total updated firmware and/or software program received on the dynamic transaction card. The received checksum may then be compared with the calculated checksum. And, if the received checksum is equal to the calculated checksum, the updated firmware and/or software program may be considered validated. If the received checksum is not equal to the calculated checksum, the dynamic transaction card may transmit an alert to the firmware and/or software provider. This alert may trigger a backend action such as a deactivation of the dynamic transaction card, a hold on the dynamic transaction card, the transmission of a message to a user device and/or the dynamic transaction card (via the user device and/or a terminal), and/or logging the backend action in response to the alert.

A checksum may be calculated for each software program being loaded onto a transaction card at a personalization phase of the card. A personalization phase may include card manufacturer loading of software onto a transaction card and/or software development loading of software onto transaction card. A personalisation phase may include a loading of software programming onto an EMV chip to be included in a transaction card. A checksum may be transmitted to the EMV chip where the checksum may be stored. A checksum may be calculated and transmitted for each software program to be loaded onto a transaction card. A checksum may be calculated by each software application loaded onto a transaction card. For example, a checksum may be calculated for firmware loaded onto a transaction card.

In order to calculate checksums, an EMV processor may be used. For example, an EMV processor may be secured within a dynamic transaction card. An EMV processor may be a read-only microprocessor. An EMV processor may include a cryptographic coprocessor. An EMV processor may include a customer Applet to perform checksum calculations, compare calculated checksums, and/or determined when to perform checksum calculations. An EMV processor may also communicate via conductive plastic jumpers, such as the plastic jumpers disclosed in U.S. Provisional Application No. 62/270,449, the entire contents of which are incorporated herein.

Once an update is validated, a bootloader on the dynamic transaction card may receive a boot signal from a device, such as a the secure terminal and/or a user device, use the bootloader signal to validate the bootloader and determine whether the existing firmware and/or software is valid, load the updated firmware and/or software program, and execute the updated firmware and/or software program, which overwrites the existing firmware and/or software.

A status of the update procedure may be logged on the dynamic transaction card, a user device (once the status is transmitted from the dynamic transaction card to the user device), and/or a backend system via a user device connection (e.g., financial institution, firmware/software provider system, and/or the like).

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving systems, methods, and devices used in securely updating firmware and/or software on an electronic device, such as a dynamic transaction card, according to embodiments of the disclosure. An EMV chip may be used as a 'TPM in order to store and calculate checksums for firmware and/or application validation, according to embodiments of the disclosure. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs.

A dynamic transaction card as a device with an EMV processor that securely receives and processes firmware and/or software updates is used as an example for the disclosure. The disclosure is not intended to be limited to dynamic transaction cards only. For example, many other small electronic devices may incorporate an EMV processor may securely receive and process firmware and/or software updates according to the embodiments disclosed herein.

Additionally, the use of "mobile device" in the examples throughout this application is only by way of example. Any type of device capable of communicating with a transaction card or a backend system may also be used, including, for example, Automated Teller Machines (ATM) personal computers, tablets, gaming systems, televisions, or the like.

Figure 1:
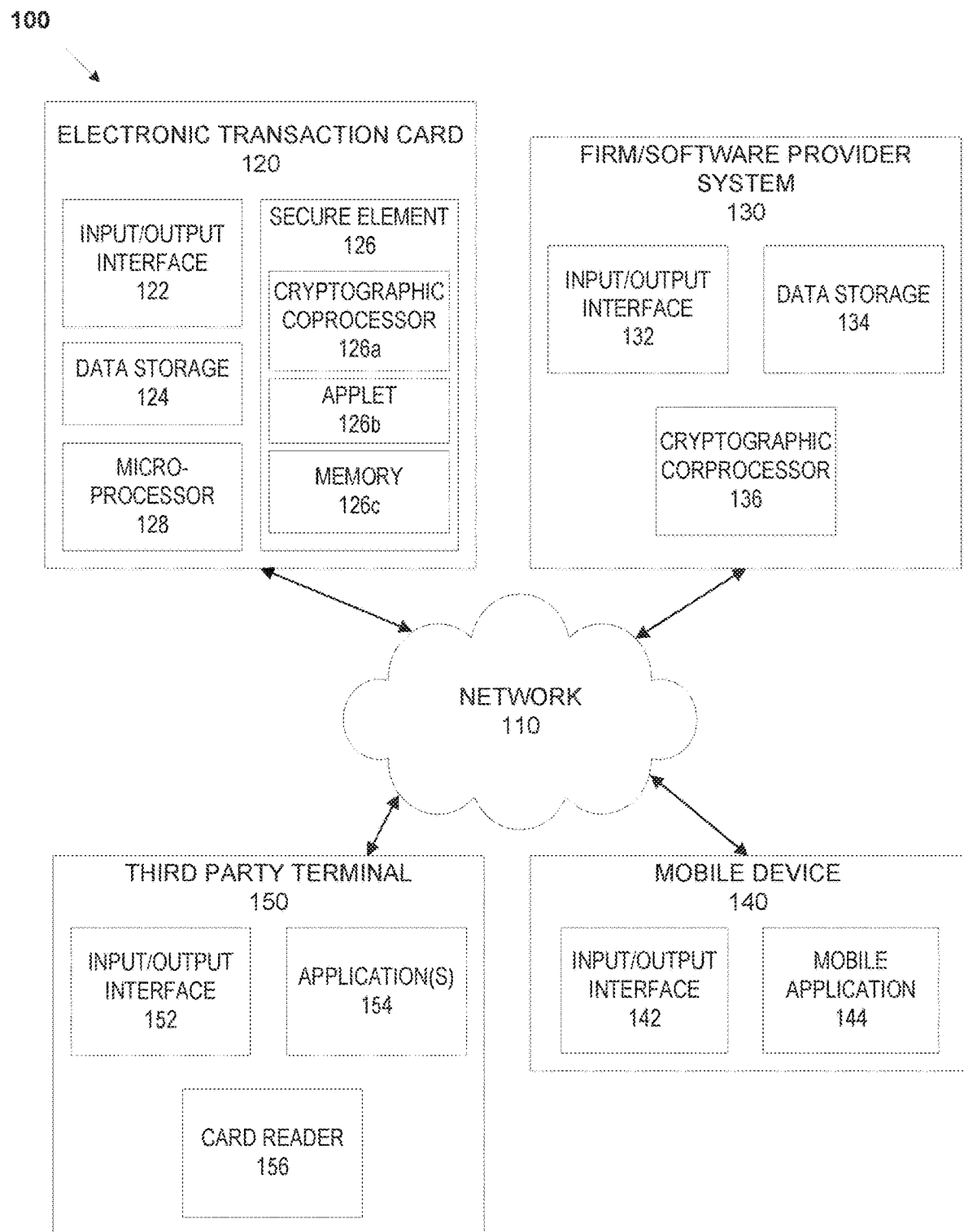
FIG. 1 depicts an example system that securely update firmware and/or software on an electronic device, according to embodiments of the disclosure.

FIG. 1 depicts an example system 100 including a dynamic transaction card 120 such as a dynamic transaction card, as described herein, having a secure element, such as an EMV processor, which may be used as a TPM, that may be used to securely update the dynamic transaction card 120. As shown in FIG. 1, an example system 100 may include one or more dynamic transaction cards 120, one or more firmware/software provider systems 130, one or more mobile devices 140, and one or more third party terminals 150 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Dynamic transaction card 120, firmware/software provider system 130, mobile device 140 and/or third party terminal 150 may include, for example, one or more mobile devices, such as, for example, personal digital assistants (PDA), tablet computers, smart watches, and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Dynamic transaction card 120 (e.g., a dynamic transaction card as described herein), firmware/software provider system 130, mobile device 140 and/or third party system 150 (e.g., a third party terminal as described herein) also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a smart watch, a personal digital assistant (PDA), a thin client, a fat client, an Internet browser, or other device. The network-enabled computer systems may execute one or more software applications to, for example, receive data as input from an entity accessing the network-enabled computer system, process received data. transmit data over a network, and receive data over a network. For example, communication between an electronic device 120 and/or mobile device 140 may be facilitated using, for example, components illustrated in FIG. 3 to transmit and/or receive data from a backend system, such as firmware/software provider 130 and/or third party terminal 150. More details regarding the features and functionality of an electronic user device are found in, for example, U.S. Provisional Application No. 62/270,465 filed on Apr. 14, 2015.

Dynamic transaction card 120, firmware/software provider system 130, mobile device 140 and/or third party terminal 150 may include at least one central processing unit (CPU), which may be configured to execute computer program instructions to perform various processes and methods. Dynamic transaction card 120, firmware/software provider system 130, mobile device 140 and/or third party terminal 150 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory• (PROM), erasable programmable real-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

Dynamic transaction card 120, firmware/software provider system 130, mobile device 140 and/or third party terminal 150 may further include, for example, a processor, which may be several processors, a single processor, or a single device having multiple processors. Although depicted as single elements, it should be appreciated that according to one or more embodiments, dynamic transaction card 120, firmware/software provider system 130, mobile device 140 and/or third party terminal 150 may comprise a plurality of dynamic transaction cards 120, firmware/software provider systems 130, mobile devices 140 and/or third party terminals 150.

As shown in FIG. 1, dynamic transaction card 120, firmware/software provider system 130. mobile device 140 and/or third party terminal 150 may include various components. These components may be understood to refer to computer executable software, firmware, hardware, and/or various combinations thereof. It is noted that where a component includes software and/or firmware, the components is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component.

As depicted in FIG. 1, a dynamic transaction card 120 may include an input/output interface 122, data storage 124, a secure element 126 comprising a cryptographic coprocessor 126a, an apple (126b, and memory 126c, and/or a separate microprocessor 128. These components of dynamic transaction card 120 may include various components as described in, for example, FIGS. 2 and 3.

Input/output interface 122 may include for example, I/O devices, which may be configured to provide input and/or output to/from dynamic transaction card 120 (e.g., keyboard, mouse, display, speakers, printers, modems, network cards, etc.). Input/output interface 122 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of dynamic transaction card 120, and a bus that allows communication among the various components of dynamic transaction card 120. Input/output interface 122 may include a display, which may include for example output devices, such as a printer, display screen (e.g., monitor, television, and the like), speakers, projector, and the like. Although not shown, dynamic transaction card 120 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Data storage 124 may include random access memory (RAM) and read only memory (ROM), which may be configured to access and store data and information and computer program instructions, such as firmware and/or other applications. Data storage 124 may also include storage media or other suitable type of memory• (e.g., such as, for example, RAM, ROM programmable read-only memory (PROM), erasable programmable read-only memory (EPROM), electrically erasable programmable read-only memory (EEPROM), any type of tangible and non-transitory storage medium), where the files that comprise an operating system, application programs, and data files may be stored.

A secure element 126 may include a secure microprocessor, such as an EMV processor. Secure element 126 may act as a trusted platform module (TPM) and include several components. For example, secure element 126 may include a cryptographic coprocessor 126a, an applet 126b, and/or a memory 126c. Cryptographic coprocessor 126a may include a random number generator, a key generator, a hash generator, and/or an encryption/decryption signature engine. An applet 126b may include instructions stored therein that, when executed, initiate a checksum calculation and comparison as described herein. Memory 126c may store a cryptographic key, a checksum used to validate firmware and/or software applications stored in the dynamic transaction card 120.

Applet 126b may include scripts, firmware and/or software that may be used to securely update firmware and/or software as disclosed herein. For example, scripts, firmware and/or software may include instructions to determine if a portion of data received from a secure terminal includes an entire firmware and/or software update, instruction to decrypt received data using cryptographic coprocessor 126a, and/or use cryptographic coprocessor 126a to calculate checksums for comparison as described herein.

Applet 126b may include instructions that when executed instruct secure element 126 to run a validation of firmware and/or software at a particular interval. For example, validation may be performed upon: card-holder request via an input on the transaction card, transaction card usage, a transaction amount exceeding a threshold for a transaction card, fraud detection associated with the transaction card, powering-up of the transaction card, waking-up of the transaction card, network connection of the transaction card, and/or a transaction card/smart phone connection. Validation may be performed at predefined intervals, where the predefined intervals are stored within the validation programming and are defined by transaction card manufacturer, firmware provider, software application provider, and/or a transaction card holder. Validation may occur using various cryptographic algorithms, such as, sha, md5, and/or the like.

Validation may compare a calculated checksum with a checksum stored in EMV chip memory. If the validation determines, for example, that a checksum calculated for firmware and/or a software application stored in storage and/or a separate microprocessor of a transaction card matches a checksum stored in EMV chip memory of the transaction card, the transaction card may operate normally. If the validation determines, for example, that a checksum calculated for firmware and/or a software application stored in a microprocessor of a transaction card does not match a checksum stored in EMV chip memory of the transaction card, the transaction card may freeze all capabilities, erase the memory of the transaction card, display data indicative of a fraudulent or inactive transaction card, and/or the like.

Microprocessor 128 may store and/or execute firmware and/or software applications stored in scripts, firmware and/or software 120. Firmware and/or software applications may be updated and/or validated using secure element 126.

Firmware/software provider system 130 may include an input/output interface 132, data storage 134, and/or a cryptographic coprocessor 136. Input/output interface 132 may include for example, I/O devices, which may be configured to provide input and/or output to/from firmware/software provider system 130 (e.g., keyboard, mouse, display, speakers, printers, modems, network cards, etc.). Input/output interface 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of firmware/software provider system 130, and a bus that allows communication among the various components of firmware/software provider system 130. Input/output interface 132 may include a display, which may include for example output devices, such as a printer, display screen (e.g., monitor, television, and the like), speakers, projector, and the like. Although not shown, firmware/software provider system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Data storage 134 may include random access memory (RAM) and read only memory (ROM), which may be configured to access and store data and information and computer program instructions, such as dynamic transaction card data (e.g., electronic card identifier, checksums associated with a dynamic transaction card, private/public key pair data associated with a dynamic transaction card, validation data, and/or the like), instructions to calculate a checksum for firmware and/or software stored on a dynamic transaction card, and/or updates to firmware and/or software for a dynamic transaction card. Data storage 134 may also include storage media or other suitable type of memory (e.g., such as, for example, RAM, ROM, programmable read-only memory (PROM), erasable programmable read-only memory (EPROM), electrically erasable programmable read-only memory (EEPROM), any type of tangible and non-transitory storage medium), where the files that comprise an operating system, application programs, and data files may be stored. Data storage 134 may include secure data storage in order to store user device data such as existing versions of firmware and/or software, updates to firmware and/or software, checksum data associated with a firmware and/or software version, private key data, public key data, user account data, user mobile device identifier, and/or the like.

Cryptographic coprocessor 136 may be a TPM that provides secure storage for storing sensitive data and/or instructions, such as, for example, checksums, private/public key pairs associated with each dynamic transaction card provided to customers and/or other sensitive data associated with each dynamic transaction card provided to customers (e.g., transaction data checksum algorithms, hashing algorithms, and/or the like).

Mobile device 140 may include an input/output interface 142 and/or a mobile application 144. Input/output interface 142 may include for example, I/O devices, which may be configured to provide input and/or output to/from mobile device 140 (e.g., keyboard, mouse, display, speakers, printers, modems, network cards, etc.). Input/output interface 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of mobile device 140, and a bus that allows communication among the various components of mobile device 140. Input/output interface 142 may include a display, which may include for example output devices, such as a printer, display screen (e.g., monitor, television, and the like), speakers, projector, and the like. Although not shown, mobile device 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Mobile application 144 may include instructions that, when executed, cause various hardware elements within mobile device 140 to perform functions associated with the instructions. For example, mobile application 144 may include instructions that, when executed, cause mobile device 140 to communicate with dynamic transaction card 120 and transmit data to dynamic transaction card 120, such as firmware and/or software updated data. Mobile application 144 may include instructions that, when executed, cause mobile device 140 to receive data from a dynamic transaction card 120, such as firmware and/or software data (e.g., existing version of firmware and/or software on an associated dynamic transaction card, update log data, and/or the like). These instructions may utilize hardware elements such as input/output interface 142 and/or a microprocessor.

Third party terminal 150 may include an input/output interface 152, an application 154, and an electronic card reader 156. Input/output interface 152 may include for example, I10 devices, which may be configured to provide input and/or output to/from third party system 150 (e.g., keyboard, mouse, display, speakers, printers, modems, network cards, etc.). Input/output interface 152 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of third party system 150, and a bus that allows communication among the various components of third party system 150. Input/output interface 152 may include a display, which may include for example output devices, such as a printer, display screen (e.g., monitor, television, and the like), speakers, projector, and the like. Although not shown, third party system 150 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Application 154 may include instructions that, when executed, cause various hardware elements within third party terminal 150 to perform functions associated with the instructions. For example, application 154 may include instructions that, when executed, cause third party terminal 150 to communicate with dynamic transaction card 120 via a card reader 156. Application 154 may include instructions to execute a financial transaction, to connect a firmware and/or software provider system 130 with a dynamic transaction card 120 in a secure manner, and/or to validate a dynamic transaction card 120. These instructions may utilize hardware elements such as input/output interface 152, microprocessor, and/or other elements described in, for example, FIG. 4.

Card reader 156 may include an EMV reader capable of maintaining contact with various contact points on and EMV plate residing on the surface of the dynamic transaction card 120 during the transmission of data between a third party terminal 150 (e.g., a PoS terminal/ATM/stand-alone secure terminal) and the dynamic transaction card 120. The connection may include a contactless connection, such as a near-field communication (NFC) connection. The connection may include any other connection as described in FIG. 4.

Figure 4:
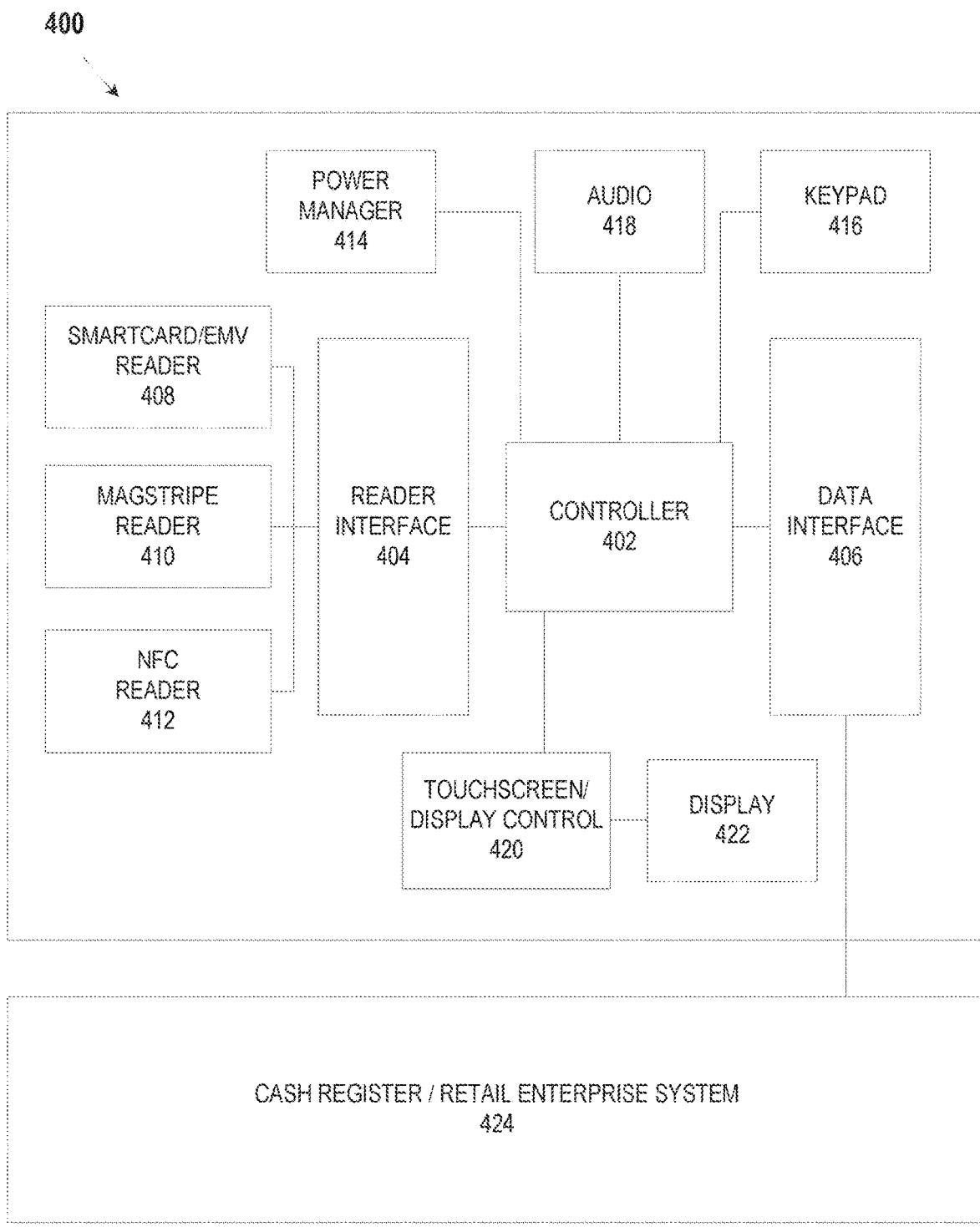
FIG. 4 depicts an example secure terminal used in dynamic transaction card secure firmware and/or software updates, according to embodiments of the disclosure.

For example, FIG. 4 depicts an example PoS device 400 as a charging system, which may be similar to third party terminal 150. PoS device 400 may provide the interface at what a card holder makes a payment to the merchant in exchange for goods or services. PoS device 400 may include and/or cooperate with weighing scales, scanners, electronic and manual cash registers, electronic funds transfer at point of sale (EFTPOS) terminals, touch screens and any other wide variety of hardware and software available for use with PoS device 400. PoS device 400 may be a retail point of sale system and may include a cash register and/or cash register-like computer components to enable purchase transactions. PoS device 400 also may be a hospitality point of sale system and include computerized systems incorporating registers, computers and peripheral equipment, usually on a computer network to be used in restaurant, hair salons, hotels or the like.

PoS device 400 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. A mobile device may include, for example, mobile device 140. PoS device 400 also may be a cloud-based point of sale system that can be deployed as software as a service, which can be accessed directly from the Internet using, for example, an Internet browser.

Referring to FIG. 4, an example PoS device 400 is shown. PoS device 400 may include a controller 402, a reader interface 404, a data interface 406, a smartcard and/or EMV chip reader 408, a magnetic stripe reader 410, a near-field communications (NFC) reader 412, a power manager 414, a keypad 416, an audio interface 418, a touchscreen/display controller 420, and a display 422. Also, PoS device 400 may be coupled with, integrated into or otherwise connected with a cash register/retail enterprise system 424.

In various embodiments, Controller 402 may be any controller or processor capable of controlling the operations of PoS device 400. For example, controller 402 may be an Intel® 2nd Generation Core™ i3 or i5 or Pentium™ G850 processor or the like. Controller 402 also may be a controller included in a personal computer, smartphone device, tablet PC or the like.

Reader interface 404 may provide an interface between the various reader devices associated with PoS device 400 and PoS device 400. For example, reader interface 404 may provide an interface between smartcard and/or EMV chip reader 408, magnetic stripe reader 410, NFC reader 412 and controller 402. In various embodiments, reader interface 404 may be a wired interface such as a USB, RS232 or RS485 interface and the like. Reader interface 404 also may be a wireless interface and implement technologies such as Bluetooth, the 802.11(x) wireless specifications and the like. Reader interface 404 may enable communication of information read by the various reader devices from the various reader devices to PoS device 400 to enable transactions. For example, reader interface 404 may enable communication of a credit or debit card number read by a reader device from that device to PoS device 400. In various embodiments, reader interface 404 may interface between PoS device 400 and other devices that do not necessarily "read" information but instead receive information from other devices.

Data interface 406 may allow PoS device 400 to pass communicate data throughout PoS device and with other devices including, for example, cash register/retail enterprise system 424. Data interface 406 may enable PoS device 400 to integrate with various customer resource management (CRM) and/or enterprise resource management (ERP) systems. Data interface 406 may include hardware, firmware and software that make aspects of data interface 406 a wired interface. Data interface 406 also may include hardware, firmware and software that make aspects of data interface 406 a wireless interface. In various embodiments, data interface 406 also enables communication between PoS device other devices.

Dynamic transaction card and/or EMV chip reader 408 may be any electronic data input device that connects to the contacts of an EMV plate on a transaction card. Through these connections EMV chip reader 408 may transmit power to the dynamic transaction card, read data from a dynamic transaction card and/or EMV chip, and send data to the dynamic transaction card and/or EMV chip. Dynamic transaction card and/or EMV chip reader 408 may be capable of supplying an integrated circuit (e.g., EMV chip) on the dynamic transaction card with electricity and communicating with the dynamic transaction card via protocols, thereby enabling read and write functions. In various embodiments, dynamic transaction card and/or EMV chip reader 408 may enable reading from contact or contactless dynamic transaction cards. Dynamic transaction card and/or EMV chip reader 408 also may communicate using standard protocols including ISO/IEC 7816, ISO/IEC 14443 and/or the like or proprietary protocols.

Magnetic stripe reader 410 may be any electronic data input device that reads data from a magnetic stripe on a transaction card, for example. In various embodiments, magnetic stripe reader 410 may include a magnetic reading head capable of reading information from a magnetic stripe. Magnetic stripe reader 410 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary* use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 412 may be any electronic data input device that reads data from an NFC device. In an example embodiment, NFC reader 412 may enable Industry Standard NFC Payment Transmission. For example, the NFC reader 412 may communicate with an NFC enabled device to enable two loop antennas to form an air-core transformer when placed near one another by using magnetic induction. NFC reader 412 may operate at 13.56 MHz or any other acceptable frequency. Also, NFC reader 412 may enable a passive communication mode, where an initiator device provides a carrier field, permitting answers by the target device via modulation of existing fields. Additionally, NFC reader 412 also may enable an active communication mode by allowing alternate field generation by the initiator and target devices.

In various embodiments, NFC reader 412 may deactivate an RF field while awaiting data. NFC reader 412 may receive communications containing Miller-type coding with varying modulations, including 100% modulation. NFC reader 412 also may receive communications containing Manchester coding with varying modulations, including a modulation ratio of approximately 10%, for example. Additionally, NFC reader 412 may be capable of receiving and transmitting data at the same time, as well as checking for potential collisions when the transmitted signal and received signal frequencies differ.

NFC reader 412 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 412 may be able to utilize transmission protocols and methods that are developed in the future using other frequencies or modes of transmission. NFC reader 412 also may be backwards-compatible with existing payment techniques, such as, for example RFID. Also, NFC reader 412 may support transmission requirements to meet new and evolving payment standards including internet based transmission triggered by NFC. In various embodiments, NFC reader 412 may utilize MasterCard's® PayPass and/or Visa's® Pay Wave and/or American Express'® ExpressPay systems to enable transactions.

Although not shown and described, other input devices and/or readers, such as for example, barcode readers and the like are contemplated.

Power manager 414 may be any microcontroller or integrated circuit that governs power functions of PoS device 400. Power manager 414 may include, for example, firmware, software, memory, a CPU, a CPU, input/output functions, timers to measure intervals of time, as well as analog to digital converters to measure the voltages of the main energy storage component or power source of PoS device 400. In various embodiments, power manager 414 remains active even when PoS device 400 is completely shut down, unused, and/or powered by the backup energy storage component. Power manager 414 may be responsible for coordinating many functions, including, for example, monitoring power connections and energy storage component charges, charging batteries when necessary, controlling power to other integrated circuits within PoS device 400 and/or other peripherals and/or readers, shutting down unnecessary system components when they are left idle, controlling sleep and power functions (on and off), managing the interface for built-in keypad and trackpads, and/or regulating a real-time clock (RTC).

Keypad 416 may any input device that includes a set of buttons arranged, for example, in a block or pad and may bear digits, symbols and/or alphabetical letters. Keypad 416 may be a hardware-based or mechanical-type keypad and/or implemented in software and displayed on, for example, a screen or touch screen to form a keypad. Keypad 416 may receive input from a user that pushed or otherwise activates one or more buttons on keypad 416 to provide input.

Audio interface 418 may be any device capable of providing audio signals from PoS device 400. For example, audio interface may be a speaker or speakers that may produce audio signals. In various embodiments, audio interface 418 may be integrated within PoS device 400. Audio interface 418 also may include components that are external to PoS device 400.

Touchscreen/display control 420 may be any device or controller that controls an electronic visual display. Touchscreen/display control 420 may allow a user to interact with PoS device 400 through simple or multi-touch gestures by touching a screen or display (e.g., display 422). Touchscreen/display control 420 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 420 may receive inputs from the touchscreen and process the received inputs. Touchscreen/display control 420 also may control the display on PoS device 400, thereby providing the graphical user interface on a display to a user of PoS device 400.

Display 422 may be any display suitable for a PoS device. For example, display 422 may be a TFT, LCD, LED, or other display. Display 422 also may be a touchscreen display that for example allows a user to interact with PoS device 400 through simple or multi-touch gestures by touching a screen or display (e.g., display 422). Display 422 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 422 may receive inputs from control gestures provided by a user. Display 422 also may display images, thereby providing the graphical user interface to a user of PoS device 400.

Cash register/retail enterprise system 424 may me any device or devices that cooperate with PoS device 400 to process transactions. Cash register/retail enterprise system 424 may be coupled with other components of, PoS device 400 via, for example, a data interface (e.g., data interface 406) as illustrated in FIG. 4. Cash register/retail enterprise system 424 also may be integrated into PoS device 400.

In various embodiments, cash register/retail enterprise system 424 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 424 may comprise a retail enterprise system and/or a customer relationship management system. Retail enterprise system 424 may enable retain enterprises to manage operations and performance across a retail operation. Retail enterprise system 424 may be a stand-alone application in, for example, individual stores, or may be interconnected via a network. Retail enterprise system 424 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at PoS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date, issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 424 also may include inventory control and tracking capabilities, reporting tools, customer management capabilities, employee management tools, and may integrate with other accounting software.

In various embodiments cash register/retail enterprise system 424 may be a hospitality PoS. In such embodiments, retail enterprise system 424 may include hospitality PoS software (e.g., Aloha PoS Restaurant software from NCR®, Micros® RES and Symphony software and the like), hospitality management software, and other hardware and software to facilitate hospitality operations.

Figure 2:
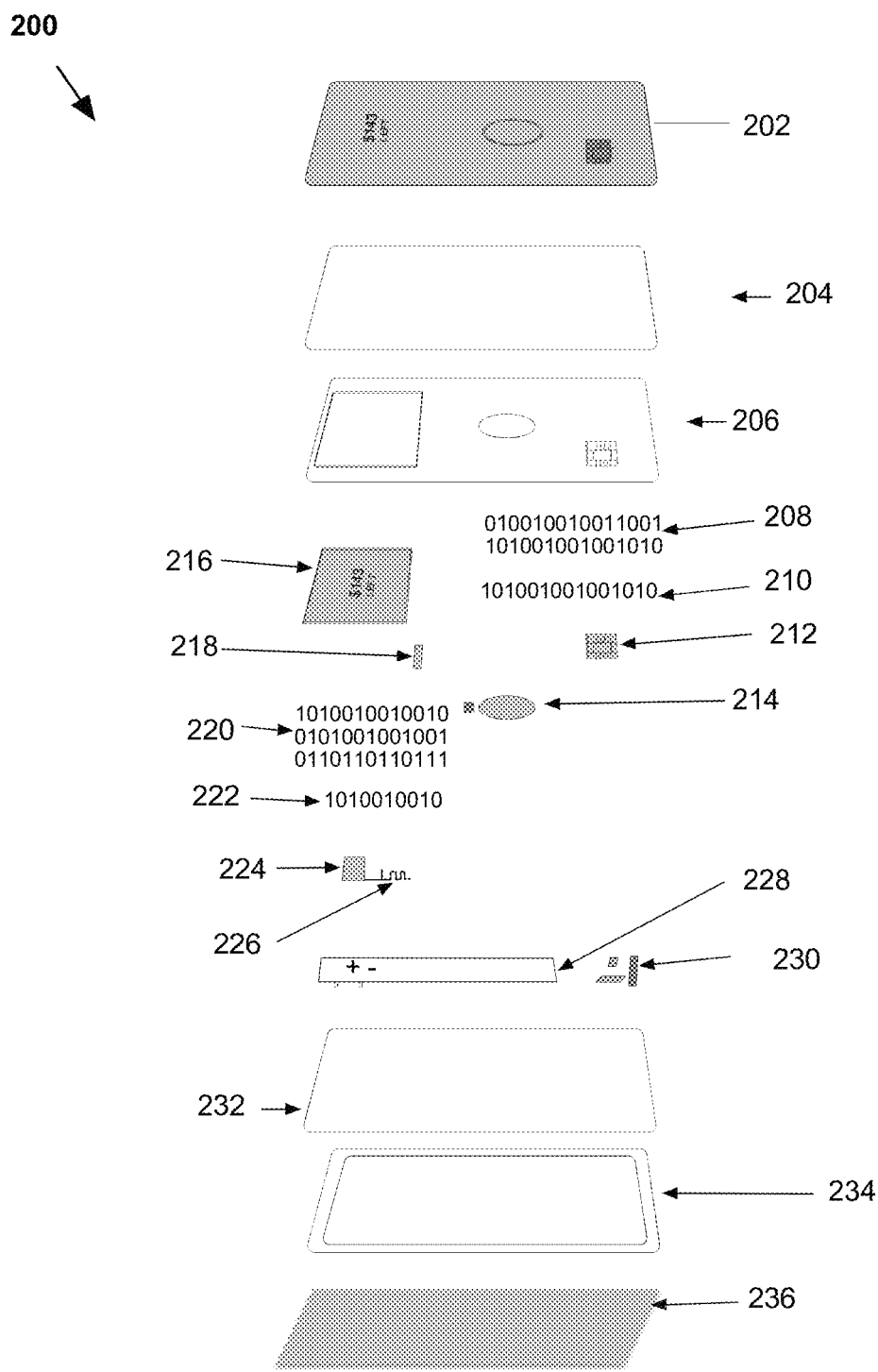
FIG. 2 depicts an example dynamic transaction card that receives and processes secure firmware and/or software updates, according to embodiments of the disclosure.

As discussed above, an electronic device having a TPM may include a dynamic transaction card. FIG. 2 depicts an example dynamic transaction card 200 with an EMV chip 212 (e.g., an EMV processor as described herein, that may serve as a TPM. EMV processor 212 may be similar to secure element 126 described in FIG. 1.

As shown in FIG. 2, dynamic transaction card 200 may include a top output layer 202. The top output layer may be a film covering, a plastic covering, and/or the like. The top output layer 202 may be constructed of scratch-resistant and/or scratch-proof materials. Materials that may be used as a top outer layer 202 may include polyvinyl chloride (PVC), polylactic acid (PLA), acrylonitrile butadiene styrene (ABS), polyethylene terephthalate (PET), Polyethylene terephthalate glycol-modified (PET-G), and/or the like. A dynamic transaction card 200 may further include a top protective layer 204, such as a clear scratch-resistant coating and/or scratch-proof material to protect the underlying components. For example, various scratch-resistant materials include materials coated with a scratch resistant chemical coating, such as a UV curable chemical coating. Scratch-proof materials may include a mineral glass, a sapphire glass material, PVC, PET, and/or PET-G.

A dynamic transaction card 200 may include a potting 206 or filler epoxy around the electrical components to provide strength and/or water resistance. A potting 206 may include a light guide, which may be constructed of optical grade materials such as acrylic, resin, polycarbonate, epoxies, and/or glass. Potting 206 may also include injection molding, such as over molding and/or multi-shot to encapsulate the internal components of card 200. For example, injection molding may include ABS, thermoplastic elastomers (TPE), thermoplastic vulcanizates (TPV), thermoplastic polyurethane (TPU), PET, polycarbonates (PC), and/or silicone.

A dynamic transaction card 200 may further include a Java Applet 208 and Java Applet integration 210. Although a Java Applet 208 is used through the specification, any other similar type of code application may be used. Moreover, although Java Applet integration 210 is used throughout this specification, any type of interface may be used to allow the microcontroller to interact with the EMV processor. A Java Applet 208 may include code that executes payments, such as payment made using an EMV processor. A Java Applet 208 may include account-provider specific code to execute display functionality specific to the account provider. Java Applet integration 210 may include coded interfaces to allow the microcontroller to interact with the EMV processor 212.

An EMV processor 212 may be connected to an EMV plate on the surface of transaction card 200, where the EMV plate may include a number of contacts that may interact with a terminal, such as third party terminal 150. During an EMV interaction, application cryptograms may be used to send and receive data packets between the dynamic transaction card 200 and a terminal. For example, data packets may include user authentication information which an acquisition system and/or issuing financial institution may use to authenticate a transaction card 200 during a transaction. Data packets may also include firmware and/or software update data, such as a portion or all of an updated firmware and/or software version, a cryptographic key associated with a firmware and/or software update, and/or a checksum associated with a firmware and/or software update.

Various cryptographic protocols and/or methods may be used in this data transmission and reception process. Moreover, during a transaction issuing financial institutions and/or acquisition systems may return script commands to the EMV processor 212 via a terminal. These script commands and/or data packets may be transmitted between parties over a network. Script commands may be used, for example, to block transactions, change transaction data stored on the EMV processor (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

EMV processor 212 may also include a set of rules and/or EMV scripts to update firmware and/or software stored on dynamic transaction card 200. For example, EMV scripts may allow an issuer (e.g., firmware/software provider system 130, third party system 150, and/or firmware/software provider system 130 or third party system 150 via mobile device 140) to update and change a set of rules, various parameters (e.g., card settings, fraud settings, and/or the like), and data (e.g., key information, identifiers, and/or the like) stored in EMV chip 212 and/or elsewhere on card 200. EMV scripts may be activated via a terminal (e.g., third party terminal 150 and/or the like) and/or a mobile device connected via a network to an issuer system (e.g., issuer system via mobile device 140). EMV scripts may be pre-loaded on EMV processor 212 and/or delivered, in whole or in part via commands to update a script, after a card has been issued.

EMV processor 212 may include storage for cryptographic keys (e.g., public keys, private keys, and/or the like), checksums, and/or other validation data associated with firmware and/or software stored on the dynamic transaction card 200. EMV processor 212 may include an applet to initiate firmware/software update validation by calculating a new checksum for the firmware/software update on dynamic transaction card 200 and comparing that new checksum to a checksum received via a secure terminal, such as third party terminal 150 and/or a mobile device, such as mobile device 140.

EMV processor may include storage for firmware and/or software along with firmware and or software update logs. EMV processor may execute a received firmware and/or software update as described herein in FIG. 6, using data received via a third party terminal, such as third party terminal 150 and/or via a mobile device associate with the dynamic transaction card 200, such as mobile device 140. For example, should a firmware and/or software update be permitted, EMV processor 212 may instruct components (e.g., bootloader 222) on dynamic transaction card 200 to update firmware and/or software stored on dynamic transaction card. If, however, firmware and/or software update is not permitted, EMV processor 212 may instruct one or more components of dynamic transaction card 200 to take some form of action and/or EMV processor 212 may execute a corrective action itself. A corrective action may include zeroing, wiping, or deactivating dynamic transaction card 200. Zeroing, wiping, and/or deactivating a dynamic transaction card may be performed via an erase script to erase the entire or a portion of the memory of card 200, a script to sever a connection, and/or the like. A corrective action may include transmitting a notification to a firmware/software provider system, such as firmware/software provider system 130, a mobile device associated with the dynamic transaction card, such as mobile device 140, and/or a third party system (e.g., merchant system, fraud alert system, and/or the like), such as third party system 150.

Dynamic transaction card 200 may also include one or more sensors 214 to receive input. Sensors 214 may include an activation sensor and/or an operation sensor, which may be combined and/or separate. An activation sensor may activate the dynamic transaction card 200 and an operation sensor may instruct the dynamic transaction card 200 to perform an action based on the received input. An activation sensor may require a security input, such as a biometric input (e.g., fingerprint, eye scan, voice recognition, and/or the like), input indicative of a paired mobile device (e.g., BLE and/or Bluetooth pairing), input indicative of a password (e.g., a password received via a sensor on the dynamic transaction card and/or a password received on a paired mobile device), and/or the like. An operation sensor may change a display 216 based on received input, conduct a transaction via, for example an EMV processor 212 and/or contactless payment technologies based on received input, attempt a pairing of a card 200 and a mobile device, and/or the like.

By way of example, a sensor 214 may include a capacitive touch sensor, a piezoelectric sensor, load cells, a light sensor, a temperature sensor, a resistive touchscreen, including for example an analogue matrix real (AMR) sensors, and/or the like. Sensors 214 may include accelerometers to detect motion input.

Although the sensor 214 is depicted at a particular spot in the transaction card 200, a sensor 214 may be placed at any portion of the card to detect, for example, touch, light, heat, energy, and/or the like. For example, a sensor may be placed around the outer edges of a dynamic transaction card 200 or at any spot within the dynamic transaction card 200. Sensor 214 also may include the entire exterior surface of transaction card 200.

A display 216 may be provided within the transaction card 200. Although the display as shown includes, for example, a dot matrix display, a number of other display options may be included in the transaction card 200. For example, lighting, such as LED lighting, OLED lighting, and/or the like, may be used as display components. Display components may also include electronic paper, Mirasol, TF LCD, Quantum Dot Display, and/or the like. Where lighting is used, various lighting technologies may be used to create a display that indicates a number of things to a cardholder. For example, edge lighting may be used to create a specific visual component in the display. A number of LED or OLED lights may be used to illuminate various portions of the display in order to output information to a card holder.

By way of example, a display 216 may be illuminated using a particular color to relay to the cardholder balance information of an account associated with a transaction card, such as an RGB LED matrix panel and/or RGB LED displays. A red light display may indicate that the account balance is within a first predetermined dollar amount or a first predetermined percentage of the total spending limit, a particular budget, a particular budget category, and/or the like. A yellow light display may indicate that the account balance is within a second predetermined dollar amount or a second predetermined percentage of the total spending limit, a particular budget, a particular budget category, and/or the like. A green light display may indicate that the account balance is within a third predetermined dollar amount or a third predetermined percentage of the total spending limit, a particular budget, a particular budget category, and/or the like. Various colors and or number of categories may be used to output this information to a cardholder. A display 216 may include other display component, such as, for example, LCD technology, ePaper technology (e.g., E-Ink), vacuum florescent display technology, and/or the like.

By way of example, a display may include a number of LED or OLED lights that may be lit in a particular pattern to indicate transaction and/or account information. For example, a display may include a circle, semicircle, or other shape of LED or OLED lighting, where the number of lights illuminated indicates a dollar amount or a percentage of the total spending limit, a particular budget, a particular budget category, and/or the like.

A display may be altered and/or modified, for example, for example, where dynamic transaction card 200 includes a debit account, a first credit account, and a second credit account, display components 216 may reflect the card number, security code, expiration date, and/or other necessary data indicative of the account (e.g., second credit account) that is being used to execute a transaction. A display may be altered and/or modified when, for example, a dynamic transaction card 200 receives new card data and/or new account data from an account holder's mobile device via a wireless connection and/or a terminal via a contact-based or contactless connection.

For example, where an account has been marked as associated with fraudulent activity and/or an invalid firmware and/or software update, an account holder and/or issuing financial institution may deactivate the card associated with the account and issue a new card. New card data may be transmitted from the issuing financial institution to, for example, an account holder's mobile device or a third party terminal via a network, and then from an account holder's mobile device or a third party terminal to electronic card 200 via a contact-based or contactless connection. A display may also be altered and/or modified when electronic card 200 activates a new account. For example, when an account holder applies for a new account (e.g., a new credit card account, a new checking account, and/or the like), if approved, new account data may be transmitted to electronic card 200. New account data may be received at an account holder's mobile device from an issuing financial institution via a network (e.g., using a mobile application, mobile optimized website, and/or the like). New account data may then be transmitted from an account holder's mobile device to electronic card 200 via a wireless connection (e.g., BLE, RFID, NFC, WiFi, optical, and/or the like) or a contact connection (e.g., using a terminal in contact with an EMV chip and/or other microchip).

A dynamic transaction card 200 may include a display driver 218 that translates instructions from a microcontroller 224 into display images to be displayed using display components 216. A display driver 218 may include an integrated circuit (IC), a state machine, and/or the like that provides an interface function between the display and the microcontroller 224. A display driver 218 may include memory (e.g., RAM, Flash, ROM, and/or the like) and/or firmware that includes font display data.

A dynamic transaction card 200 may include firmware 220 and/or a bootloader 222. Firmware 220 may be updated as described herein using EMV processor 212. A bootloader 222 may include code to be executed as an electronic card 200 is activated and before any operating system, firmware, or other code is executed on the dynamic transaction card 200. A bootloader may be activated via a sensor 214 and power source 228 of the dynamic transaction card 200. Bootloader 222 may be activated and/or load an application and/or program upon detection that card 200 has been inserted into a terminal, charger, and/or the like. Bootloader 22 may be activated and/or load firmware and/or software updates upon receiving instructions to do so. Bootloader 222 may be activated using only one technique described herein, using multiple techniques described herein, and/or using a card holder or card provider selected technique(s) described herein. Bootloader 222 may only be active during a short interval after the card 200 powers up and/or receives instructions as described herein. Card 200 may also be activated using program code that may be flashed directly to a microprocessor such as microcontroller 224, EMV processor 212, and/or the like. Card 200 may not use a bootloader 222 for all features, such as cycling between a sleep state and an active state. For example, card 200 may cycle between a sleep state and an active state using program code and/or memory.

A dynamic transaction card 200 may include a microcontroller 224 and an antenna 226. Antenna 226 may include, for example, a loop antenna, a fractal antenna, and/or the like. Antenna 226 may transmit to and receive signals from a mobile device, such as mobile device 140, to conduct transactions and display data as described throughout the specification. Microcontroller 224 may communicate with EMV processor 212, Java Applet 208, Java Applet integration 210, sensor(s) 214, power management 230, antenna 226, power source 228, display 216, display driver 218, firmware 220, bootloader 222, and/or any other component of dynamic transaction card 200. Microcontroller 224 may control the card operations to conduct transactions and/or display data as described throughout this specification.

Dynamic transaction card 200 may include a power source 228 and a PCB 232. Although energy storage component is depicted as a single component separated from PCB 232, as described herein power source component 228 may be manufactured to be integrated with PCB 232 such that the internal energy storage components lie directly on PCB 232 and PCB 232 acts as a covering for the internal energy storage components as described in U.S. Provisional Patent Application No. 62/266,324, which is incorporated herein by reference. By way of example, power source component 228 may include a lithium polymer battery', a lithium-metal battery, lithium-ceramic battery, and/or any other type of battery. Power source 228 may be constructed out of rigid materials, semi flexible materials, and/or flexible materials. Power source 228 may provide power to card components contained within dynamic transaction card 200. Power source component 228 may be a combine battery/ potting component to support dynamic transaction card 200.

Dynamic transaction card 200 may include a power management component 230 that may manage the charging and discharging of power source 228. Power management component 230 may convert voltage to a predetermined level in order to operate dynamic transaction card 200 as discussed throughout the specification. Power management component 230 and/or power source 228 may include, for example, solar power cells to convert solar energy into an electrical current within a solar panel. Power management component 230 and/or power source 228 may include connections to sensors 214 to receive input and activate dynamic transaction card 200 (e.g., motion input, thermal input, manual input, touch input, and/or the like).

A flexible printed circuit board (PCB) 232 may be included in dynamic transaction card 200. A flexible PCB 232 may include a PCB mounted in a flexible plastic substrate, such as for example, a polyimide, polyether ether ketone, and/or a transparent conductive polyester film. A flexible PCB 232 may be printed, using, for example screen printing, 3D printing, and/or the like, to arrange circuits on a material, such as polyester. Flexible PCB 232 may control and/or provide integration between the components of card 200. For example, flexible PCB 232 mechanically supports and electronically connects the electronic components of card 200 using, for example, conductive tracks, pads, and/or other features. A flexible printed circuit (FPC) may be used in place of or in conjunction with flexible PCB 232. FPC 232 may be fabricated with photolithographic technology, such as light exposure of a film material laminated to substrate and/or conductive layers. FPC 232 may be printed, silkscreened, and/or the like. FPC 232 may be used as a structural member for the electronic components of card 200 and/or for the card system as a whole 200.

Dynamic transaction card 200 may include a chassis 234 as a frame or supporting structure. Chassis 234 may be a mount for a flexible PCB 232 with a power source 228/230, which may include an integrated energy storage component and may be constructed out of flexible or semi-flexible material as well. Chassis 234 may be constructed out of a number of materials, including but not limited to, styrene, polycarbonate, polyester, and PET. Chassis 234 may be constructed out of a conductive material. Chassis 234 may increase the rigidity of dynamic transaction card 200 to prevent damage. Chassis 234 may also be used to detect if dynamic transaction card 200 is being held by including sensors 214 around chassis 234. Where chassis 234 is constructed out of a conductive material, a dielectric constant of chassis 234 and/or card 200 may be monitored to detect handling of card 200. Chassis 234 may be included within or separate from a card backing 236. Card backing 236 may include a magnetic stripe that may be read using a magnetic stripe reader. A magnetic strip may store tracks of data that are used to conduct a transaction using a dynamic transaction card 200. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data.

A magnetic stripe may be dynamically altered. For example, a dynamic transaction card 200 that is paired to a mobile device via, for example, Bluetooth, BLE, RFID, and/or other wireless technologies, may receive new track data. The new track data may be unformatted, encrypted, encoded, and/or the like when the new track data is transmitted from the mobile device to the dynamic transaction card 200. Upon receipt of the new track data, the new track data may be routed to a microprocessor, such as EMV processor 212 and/or microcontroller 224. EMV processor 212 and/or microcontroller 224 may convert, decrypt, and/or decode the received new track data to ensure compliance with any standards. Once decrypted, decoded, and/or formatted, the new track data may be saved on the tracks of the magnetic stripe. The magnetic stripe may be deleted and then the new track data may be recorded onto the tracks. In this manner, track data stored on a magnetic stripe may be altered at any time upon pairing a dynamic transaction card 200 with a mobile device.

Card backing 236 may be made of similar material to that of the output layer 202 and/or the top protective layer 204. Card backing 236 may be made out of a plastic material.

Figure 3:
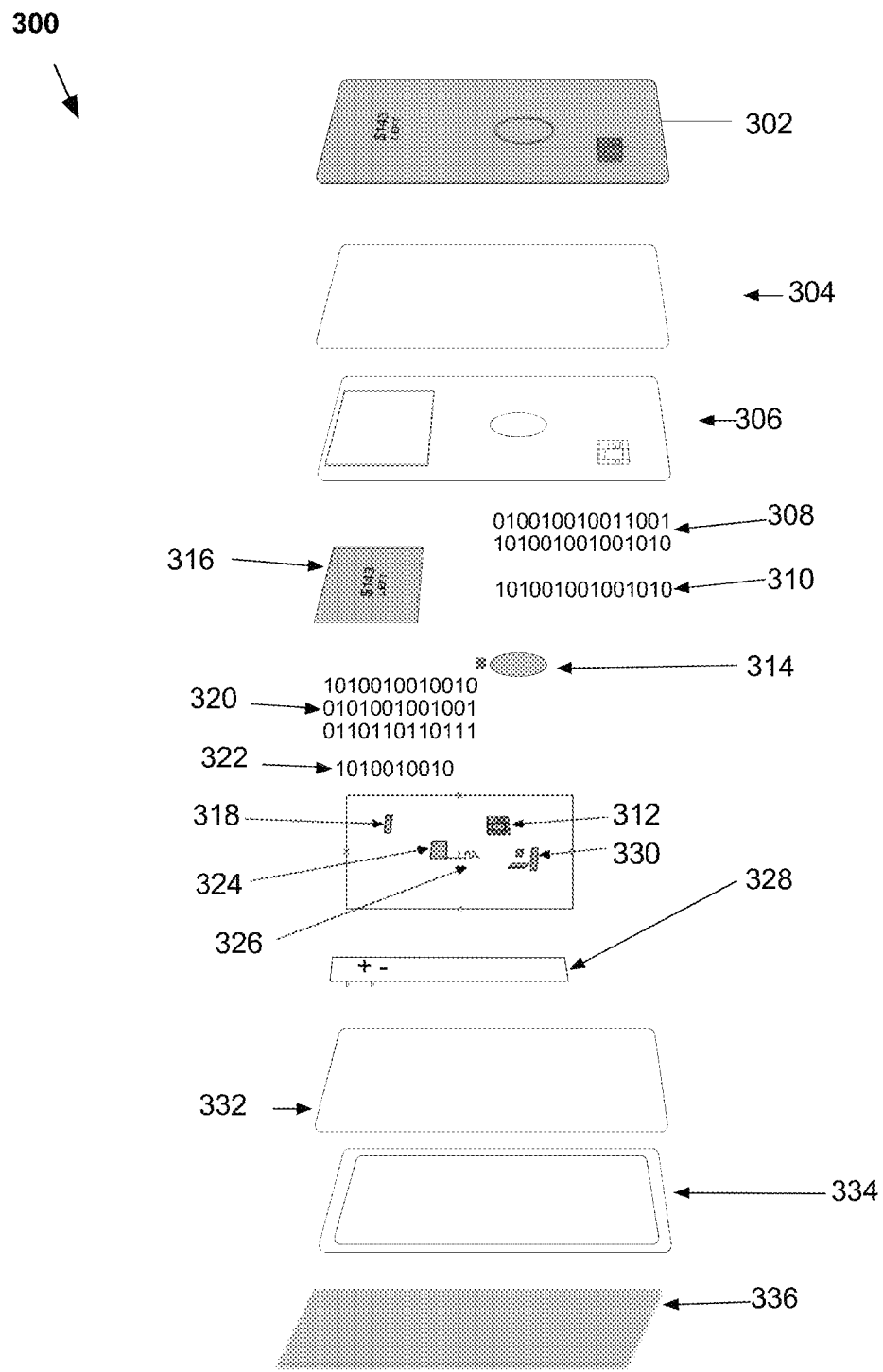
FIG. 3 depicts an example dynamic transaction card that receives and processes secure firmware and/or software updates, according to embodiments of the disclosure.

Although the components of dynamic transaction card 200 are illustrated in a particular fashion, these components may be combined and or placed throughout a dynamic transaction card 200 in any manner, such as those depicted in, for example, FIG. 3.

For example, FIG. 3 illustrates an electric transaction card having an output layer 302 which may be similar to output layer 202; an outer protective layer 304 which may be similar to outer protective layer 204; potting 306 which may be similar to potting 206; Java Applets 308 which may be similar to Java Applets 208; Java Applet integration 310 which may be similar to Java Applet integration 210; an EMV chip 312 which may be similar to EMV processor 212; a sensor 314 which may be similar to sensor 214; display 316 which may be similar to display 216; display driver 318 which may be similar to display driver 218; firmware 320 which may be similar to firmware 220; bootloader 322 which may be similar to bootloader 222; microcontroller 324 which may be similar to microcontroller 224; antenna 326 which may be similar to antenna 226; power source 328 which may be similar to power source 228; power management 330 which may be similar to power management 230; a flexible PCB 332 which may be similar to flexible PCB 232; chassis 334 which may be similar to chassis 234; and/or card backing 336 which may be similar to card backing 236.

As discussed above, a dynamic transaction card may communicate with a firmware and/or software provider system via a mobile device. For example, a mobile device may store an application associated with a firmware and/or software provider (e.g., a mobile banking application), where a firmware and/or software provider system (e.g., the financial institution associated with the mobile banking application) may transmit data to and receive data from the mobile device via the application over a network. This data may then be transmitted to a dynamic transaction card via a network (e.g., Bluetooth, BLE, WiFi, RFID, and/or the like) and/or data may be transmitted from a dynamic transaction card to a firmware and/or software provider application on a mobile device via a network for retransmission to the firmware and/or software provider system. Data transmission between a mobile device and a firmware and/or software provider system may occur using components as described in FIG. 5.

For example, system 500 may include a user device 502, which may be similar to mobile device 140 and/or third party terminal 150, a network 504, which may be similar to network 110, a front-end controlled domain 506, a back-end controlled domain 512, and a backend 518, which may be similar to firmware and/or software provider system 130. Front-end controlled domain 506 may include one or more load balancers 508 and one or more web servers 510. Back-end controlled domain 512 may include one or more load balancers 514 and one or more application servers 516.

User device 502 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a smart watch, a handheld PC, a personal digital assistant (PDA), a thin client, a fat client, an Internet browser, or other device. The one or more network-enabled computers of the example system 400 may execute one or more software applications to enable, for example, network communications.

User device 502 may include an iPhone, iPod, iPad, and/or Apple Watch from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 504 may be one or more of a wireless network, a wired network, or any combination of a wireless network and a wired network. For example, network 404 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 504 may include, without limitation, telephone lines, fiber optics, IEEE Ethernet 902.3, a wide area network (WAN), a local area network (LAN) or a global network such as the Internet. Also, network 504 may support an Internet network, a wireless communication network, a cellular network, or the like, or any combination thereof. Network 504 may further include one network, or any number of example types of networks mentioned above, operating as a stand-alone network or in cooperation with each other. Network 504 may utilize one or more protocols of one or more network elements to which they are communicatively couples. Network 504 may translate to or from other protocols to one or more protocols of network devices. Although network 504 is depicted as a single network, it should be appreciated that according to one or more embodiments, network 404 may comprise a plurality of interconnected networks, such as, for example, the Internet, a service provider's network, a cable television network, corporate networks, and home networks.

Front-end controlled domain 506 may be implemented to provide security for backend 518. Load balancer(s) 508 may distribute workloads across multiple computing resources, such as, for example computers, a computer cluster, network links, central processing units or disk drives. In various embodiments, load balancer(s) 510 may distribute workloads across, for example, web server(s) 516 and/or backend 518 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 508 may include software that monitoring the port where external clients, such as, for example, user device 502, connect to access various services of a financial institution, for example. Load balancer(s) 508 may forward requests to one of the application servers 516 and/or backend 518 servers, which may then reply to load balancer 508. This may allow load balancer(s) 508 to reply to user device 502 without user device 502 ever knowing about the internal separation of functions. It also may prevent mobile devices from contacting backend servers directly, which may have security benefits by hiding the structure of the internal network and preventing attacks on backend 518 or unrelated services running on other ports, for example.

A variety of scheduling algorithms may be used by load balancer(s) 508 to determine which backend server to send a request to, Simple algorithms may include, for example, random choice or round robin. Load balancers 508 also may account for additional factors, such as a server's reported load, recent response times, up; down status (determined by a monitoring poll of some kind), number of active connections, geographic location, capabilities, or how much traffic it has recently been assigned.

Load balancers 508 may be implemented in hardware and/or software. Load balancer(s) 508 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing: rate shaping; content-aware switching; client authentication; programmatic traffic manipulation; firewall; intrusion prevention systems.

Web server(s) 510 may include hardware (e.g., one or more computers) and/or software (e.g., one or more applications) that deliver web content that can be accessed by, for example a client device (e.g., user device 502) through a network (e.g., network 504), such as the Internet. In various examples, web servers, may deliver web pages, relating to, for example, online banking applications and the like, to clients (e.g., user device 502). Web server(s) 510 may use, for example, a hypertext transfer protocol (HTTP/HTTPS or sHTTP) to communicate with user device 502. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 510 may respond with the content of that resource or an error message if unable to do so. The resource may be, for example a file on stored on backend 518. Web server(s) 510 also may enable or facilitate receiving content from user device 502 so user device 502 may be able to, for example, submit web forms, including uploading of tiles.

Web server(s) also may support server-side scripting using, for example, Active Server Pages (ASP), PHP, or other scripting languages. Accordingly, the behavior of web server(s) 510 can be scripted in separate files, while the actual server software remains unchanged.

Load balancers 514 may be similar to load balancers 408 as described above.

Application server(s) 516 may include hardware and/or software that is dedicated to the efficient execution of procedures (e.g., programs, routines, scripts) for supporting its applied applications. Application server(s) 516 may comprise one or more application server frameworks, including, for example, Java application servers (e.g., Java platform. Enterprise Edition (Java EE), the .NET framework from Microsoft®, PHP application servers, and the like). The various application server frameworks may contain a comprehensive service layer model. Also, application server(s) 516 may act as a set of components accessible to, for example, a financial institution, or other entity implementing system 500, through an API defined by the platform itself. For Web applications, these components may be performed in, for example, the same naming environment as web server(s) 510, and application servers 416 may support the construction of dynamic pages. Application server(s) 516 also may implement services, such as, for example, clustering, fail-over, and load-balancing. In various embodiments, where application server(s) 516 are Java application servers, the web server(s) 516 may behaves like an extended virtual machine for running applications, transparently handling connections to databases associated with backend 518 on one side, and, connections to the Web client (e.g., user device 402) on the other.

Backend 518 may include hardware and/or software that enables the backend services of, for example, a financial institution, merchant, or other entity that maintains a distributed system similar to system 500. For example, backend 518 may include, a system of record, online banking applications, encryption applications, BLE/Bluetooth connection platforms, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 518 may be associated with various databases, including account databases that maintain, for example, cardholder information (e.g., demographic data, credit data, cardholder profile data, and/or the like), transaction card databases that maintain transaction card data (e.g., transaction history, account balance, spending limit, budget categories, budget spending, budget limits, and/or the like), security and connection information (e.g., public/private key pairs, UUIDs, device identifiers, and/or the like), firmware and/or software information (e.g., firmware and/or software versions, firmware and/or software updates, firmware and/or software logs, and/or the like), and/or other data discussed herein. Backend 518 also may be associated with one or more servers that enable the various services provided by system 500. Backend 518 may enable a financial institution to implement various functions associated with programming, updating, and/or reprogramming a dynamic transaction card as described herein.

Figure 6:
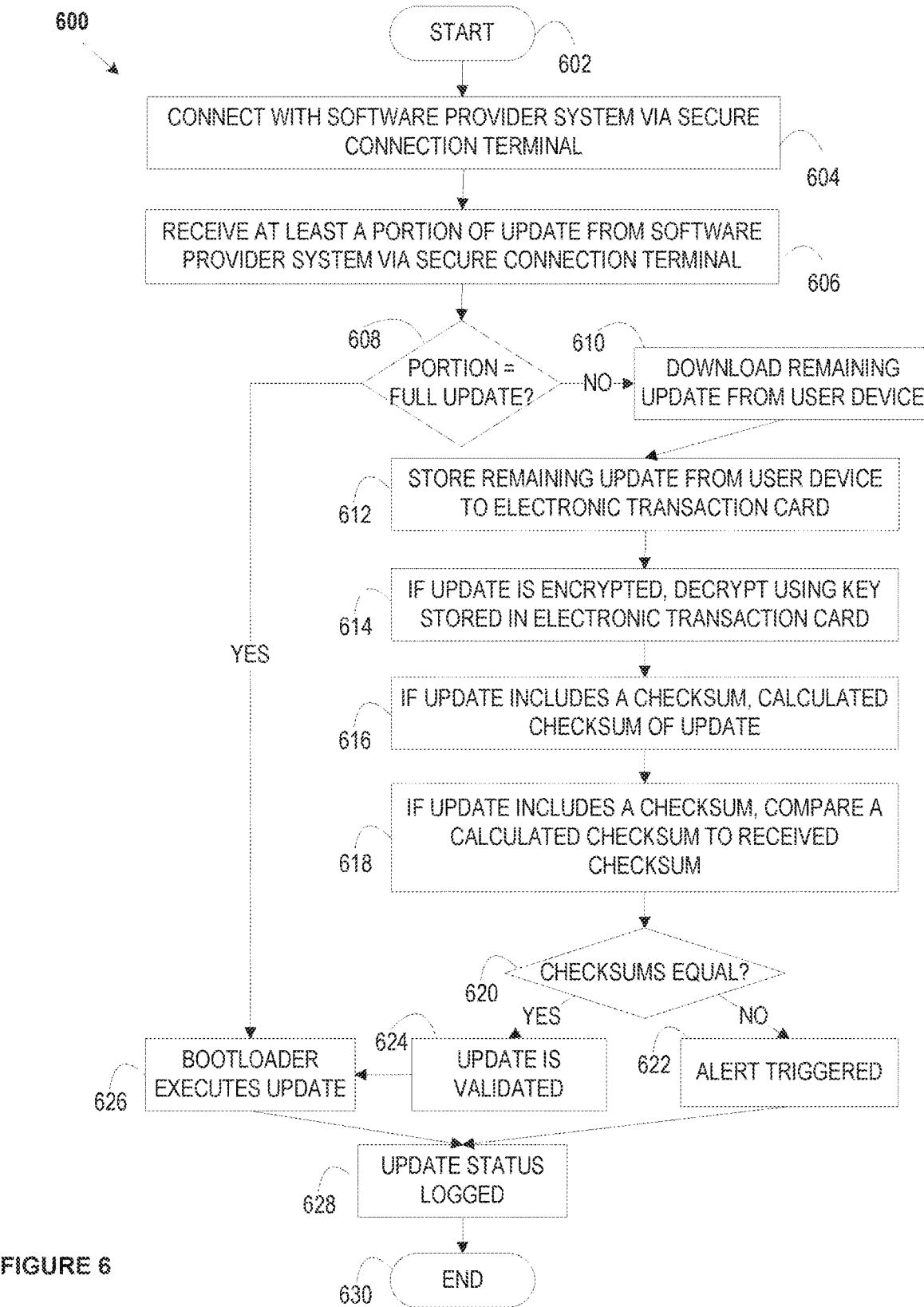
FIG. 6 depicts an example method for securely updating firmware and/or software on an electronic device, according to embodiments of the disclosure.

Securely updating firmware and/or software on a dynamic transaction card using the system components described herein may occur via the method 600 described in FIG. 6. For example, a secure firmware and/or software update may start at block 602.

At block 604, a dynamic transaction card may connect with a firmware and/or software provider system via a secure terminal connection. A dynamic transaction card may include an EMV chip with an EMV processor and an EMV plate as illustrated, for example, in FIGS. 2 and 3. A secure terminal connection may, for example, be a connection between a dynamic transaction card and a secure terminal, such as a POS terminal, an ATM, and/or a stand-alone secure terminal. A secure connection between a dynamic transaction card and a secure terminal may include a contact connection where the POS terminal/ATM/stand-alone secure terminal includes an EMV reader capable of maintaining contact with various contact points on and EMV plate residing on the surface of the dynamic transaction card during the transmission of data between the POS terminal/ATM/stand-alone secure terminal and the dynamic transaction card as discussed with respect to FIG. 4. The connection may include a contactless connection, such as a near-field communication (NFC) connection.

During this connection, a version number (e.g., 2 bytes of data) assigned to firmware and/or software stored on the dynamic transaction card may be transmitted to the secure terminal. A secure terminal may store current firmware and/or software version number data to compare a received version number with current version data to determine whether a firmware and/or software provider system should send firmware and/or software data within transaction data packets. If a secure terminal determines that the firmware and/or software stored on the dynamic transaction card requires an update, the secure terminal may decide that the transaction or interaction with the terminal requires on-line authorization or on-line communication, respectively. A dynamic transaction card may transmit an indicator to a secure terminal at predefined intervals (e.g., every x number of transactions, every x number of communications, every• x days, every x weeks, etc.) that indicates a transaction and/or communication requires on-line authorization and/or communication.

An on-line authorization and/or communication may allow the issuer (e.g., firmware and/or software provider) to review the authorization and/or communication. In reviewing the authorization and/or communication, an issuer (e.g., firmware and/or software provider) may review a data indicator that indicates a version of firmware and/or software stored on a dynamic transaction card and/or a need for an update to the firmware and/or software on the dynamic transaction card involved in the authorization request and/or communication based on a secure terminal determination that the firmware and/or software stored on the dynamic transaction card is not a current version available. In reviewing the authorization and/or communication, an issuer (e.g., firmware and/or software provider) may review a data indicator that indicates a version of the firmware and/or software on the dynamic transaction card involved in the authorization request and/or communication (e.g., when a dynamic transaction card requires an on-line authorization and/or communication at a predefined interval). An issuer and/or firmware and/or software provider may store a version number associated with a dynamic transaction card indicating the last version of firmware and/or software that was pushed to the dynamic transaction card. Upon reviewing the version of the firmware and or software stored on a dynamic transaction card associated with the authorization request and/or communication, the issuer may determine that an update is required by comparing the version number to a most recent version available.

Moreover, an issuer and/or firmware and/or software provider system may compare the version of the firmware and/or software stored on a dynamic transaction card associated with the stored version of firmware and/or software that was last pushed to the dynamic transaction card to confirm whether the firmware and/or software version stored on the dynamic transaction card matches the expected firmware and/or software version (i.e., the last version of firmware and/or software that was pushed to the dynamic transaction card). If an issuer and/or firmware and/or software provider system determines that the received version indicator from the dynamic transaction card does not match the stored version representing the last version pushed to the dynamic transaction card, the issuer and/or firmware and/or software provider system may trigger an alert, such as a fraud alert, which may in turn trigger dynamic transaction card activity (e.g., card deactivation, card hold, and/or the like).

In an example embodiment, an issuer and/or firmware/software provider system also may force an update to firmware and/or software regardless of a current version of firmware and/or software stored on a dynamic transaction card. In this manner, a secure terminal may not need to determine a current firmware and/or software version stored on a dynamic transaction card, but may require an on-line authorization and/or on-line communication to allow the issuer and/or firmware and/or software provider to force an update to the dynamic transaction card.

Once an issuer system has determined that a firmware and/or software update is required for a dynamic transaction card, either via an instruction from a secure terminal or via a comparison of a received version to the most current version stored at the issuer system, the issuer system may create an authorization and/or communication response message. A most current version stored at the issuer system may also include a rollback version (e.g., previous version). A rollback version may be tagged as the most current version stored at the issuer system when, for example, a vulnerability or bug is found in a firmware and/or software version and the issuer and/or firmware and/or software provider system desires to replace firmware and/or software versions stored on dynamic transaction cards with known secure, bug-free versions. A rollback version may be tagged as the most current version stored at the issuer system when, for example, beta testing was used for a new version and the issuer and/or firmware and/or software provider may desire to roll back a beta version to a previous version.

Figure 5:
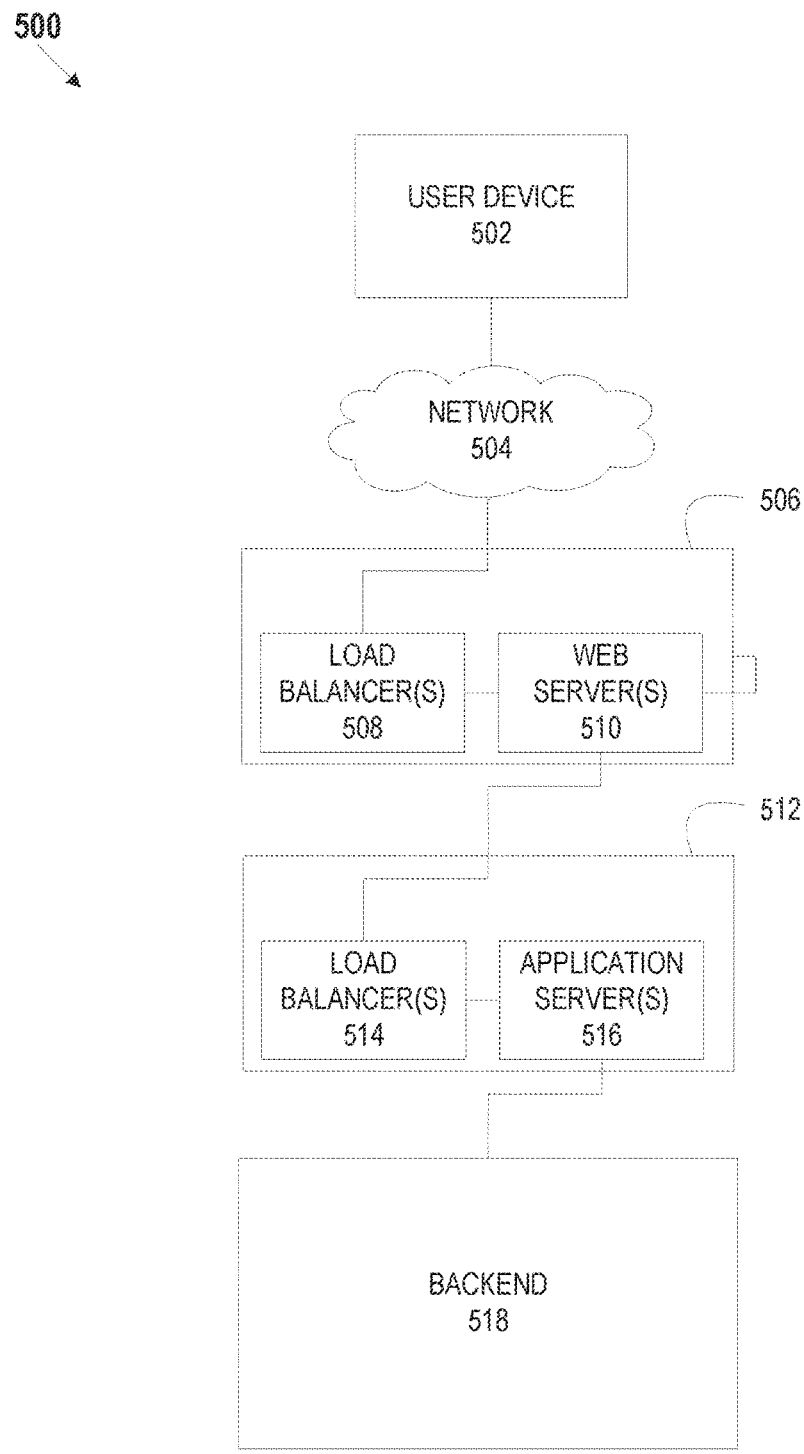
FIG. 5 depicts an example system component for securely updating firmware and/or software on an electronic device, according to embodiments of the disclosure.

Once issuer system (e.g., firmware and/or software provider) has created an authorization and/or communication response message, this response message may be transmitted to the POS terminal/ATM/stand-alone secure terminal, for example, as illustrated in FIG. 5. At block 606, the POS terminal/ATM/stand-along secure terminal may transmit at least a portion of a firmware and/or software update via the secure connection from a backend system (e.g., a financial institution system and/or other dynamic transaction card firmware and/or software provider system) to the dynamic transaction card. As described above, a firmware and/or software provider may include an issuer that may communicate with a secure terminal through an authorization or other network that is used to authorize a transaction and/or communicate with the secure terminal.

A transmission of at least a portion of a firmware and/or software update may occur during and/or at the end of a transaction, such as an EMV transaction, via an authorization and/or communication response message. The authorization and/or communication response message may include data packets according to the ISO-8583 standard. For example, ISO-8583 may include a bitmap as an indexing technique to indicate additional data elements that are present. These additional data elements may include alphabetic characters, numeric values, special characters, binary data, hex data, and/or the like.

The authorization and/or communication response message may include a portion of the updates firmware and/or software program, the entire updated firmware and/or software program, a section of the updated firmware and/or software program, a cryptographic key to decrypt a firmware and/or software update, and/or a checksum associated with the updated firmware and/or software program. At block 608, a decision may be made as to the contents of the at least a portion of firmware and/or software update received includes the entire firmware and/or software update. For example, an authorization and/or communication response message may include an indicator alerting the dynamic transaction card as to the contents of the authorization and/or communication response message. An indicator may include a data structure that works with and/or is incorporated into an ISO-8583 communication. In this manner the indicator received in the authorization and/or communication response may indicate that the received at least a portion of firmware and/or software update includes a portion of the updates firmware and/or software program, the entire updated firmware and/or software program, a section of the updated firmware and/or software program, a cryptographic key to decrypt a firmware and/or software update, and/or a checksum associated with the updated firmware and/or software program. The dynamic transaction card may be alerted as to the contents of the authorization and/or communication response message via an associated mobile device. For example, an issuer and/or firmware and/or software provider system may transmit a notification to an associated mobile device that a firmware and/or software update (and/or a portion thereof) is pending on the dynamic transaction card. A mobile device may then notify the dynamic transaction card that the received authorization and/or communication response message includes a firmware and/or software update (and/or portion thereof).

Where the at least a portion of a firmware and/or software updated including the entire updated firmware and/or software program, a bootloader on the dynamic transaction card may execute the update at block 626. For example, a bootloader may receive a boot signal from a device, such as a the secure terminal and/or a mobile device, use the bootloader signal to validate the bootloader and determine whether the existing firmware and/or software is valid, load the updated firmware and/or software program, and execute the updated firmware and/or software program, which overwrites the existing firmware and/or software.

If the at least a portion of the firmware and/or software update is not the entire updated firmware and/or software program, the remaining portion of the firmware and/or software update may be downloaded from a user device, such as a smart phone, tablet, computer, and/or the like, via a network, such as a Bluetooth, Bluetooth Low Energy (BLE), NFC, WiFi, and/or other wireless network, in block 610. Where the at least a portion of the firmware and/or software update is not the entire updated firmware and/or software program, a notification may be received on the dynamic transaction card to alert and instruct the card holder to connect to an associated mobile device and download the remaining update from the mobile device via a network connection. Where the at least a portion of the firmware and/or software update is not the entire updated firmware and/or software program, a notification may be received on a mobile device associated with a dynamic transaction card to alert and instruct the card holder to connect to an associated mobile device and download the remaining update from the mobile device via a network connection.

At block 610, the remaining portion of the firmware and/or software update may be downloaded from a mobile device associated with the dynamic transaction card. This download may occur by connecting the dynamic transaction card to the mobile device. A connection between a dynamic transaction card and a mobile device may include a physical connection, such as using a portable EMV reader attached to the user device, a mobile device that includes an electronic card reader, and/or the like. A connection may include a contactless connection, such as a Bluetooth or BLE connection as described in U.S. patent application Ser. No. 14/977,730 entitled "System, Method, and Apparatus for Locating a Bluetooth Enabled Transaction Card," the entire contents of which are incorporated by reference. A connection may include other contactless connections such as using a WiFi connection, an NFC connection, an RFID connection, and/or the like.

At block 612, the remaining update received from a firmware and/or software provider via a mobile device may be stored within a dynamic transaction card. The update may be temporarily stored, for example, in a secure element, such as an EMV processor, in order to separate the update from additional elements of the dynamic transaction card and prevent any tampering. If necessary, the remaining update received via a mobile device may be connected to the at least a portion of the update received via a secure terminal using identifiers included in the remaining update received via a mobile device and the at least a portion of the update received via a secure terminal. In this manner, the dynamic transaction card may identify the received data as being part of the same, or identified, updated version. A version number (e.g., 2 bytes of data) assigned to firmware and/or software stored on the dynamic transaction card may be transmitted to the secure terminal. A secure terminal may store current firmware and/or software version number data to compare a received version number with current version data to determine whether a firmware and/or software provider system should send firmware and/or software data within transaction data packets.

Where a dynamic transaction card has multiple updates pending, the dynamic transaction card may transmit a query to an associated mobile device which then causes the associated mobile device to transmit a query to an issuer and/or firmware/software provider system to retrieve a checksum associated with the binary for the most current (or correct) update stored on the dynamic transaction card. This checksum may then be transmitted to the dynamic transaction card via a secure terminal and/or an associated mobile device. The dynamic transaction card may then calculate a checksum associated with each pending update using, for example, an EMV processor, and compare the calculated checksums with the received checksum. If the dynamic transaction card determines that a calculated checksum matches the received checksum, the dynamic transaction card may execute the update associated with the matched calculated checksum. The dynamic transaction card may also delete all pending updates that do not match the received checksum. Once each received portion of the update is identified and/or validated as associated with a particular update version, the entire contents of the update version may be stored together in, for example, a secure element of the dynamic transaction card. (e.g., EMV processor).

At block 614, if any portion of the firmware and/or software update downloaded from a mobile device or secure terminal is encrypted, the dynamic transaction card may decrypt it. For example, the portion of the firmware and/or software update received from the secure terminal may include a key (e.g., a private key, a public key, and/or the like) to decrypt the remaining portion received from a user device. An EMV processor may also include pre-stored keys (e.g., private keys, public keys, and/or the like) that may be used to decrypt the remaining portion of a firmware and/or software update received from a user device. For example, an EMV processor may include storage for cryptographic keys (e.g., public keys, private keys, and/or the like). Moreover, the remaining portion of the firmware and/or software update downloaded in block 610 may include a cryptographic key, a key identifier, and/or the like that may be used to decrypt and/or identify a pre-stored key that may be used to decrypt the remaining firmware and/or software update.

At block 616, if any portion of the firmware and/or software update downloaded from a mobile device in block 610 or the portion of the firmware and/or software update received from the secure terminal in block 606 includes a checksum associated with the firmware and/or software update, this checksum may be used to verify the firmware and/or software update. For example, a checksum may be calculated for the total updated firmware and/or software program received on the dynamic transaction card in block 616. In order to calculate checksums, an EMV processor may be used. For example, an EMV processor may be secured within a dynamic transaction card. An EMV processor may be a read-only microprocessor. An EMV processor may include a cryptographic coprocessor. An EMV processor may include a custom Applet to perform checksum calculations, compare calculated checksums, and/or determined when to perform checksum calculations. An EMV processor may also communicate via conductive plastic jumpers, such as the plastic jumpers disclosed in U.S. Provisional Application No. 62/270,449, the entire contents of which are incorporated herein. In this manner, if a dynamic transaction card were to be tampered with (e.g., using a solution to take apart the dynamic transaction card and reverse engineer or determine data stored within the electric transaction card), the data, including firmware and/or software update data, would remain secure because the plastic jumpers would dissolve and no connection to the EMV processor would be available. Moreover, checksum validation as described herein may occur for any firmware and/or software stored on a dynamic transaction card as disclosed in U.S. Provisional Application No. 62/270,465, the entire contents of which are incorporated herein.

The received checksum may then be compared with the calculated checksum in block 618. In block 620, this comparison may verify that the total update matches an expected update or may trigger an alert that the update does not match the expected update, thereby indicating that the update may include any additional malware, spyware, and/or the like.

If the received checksum is equal to the calculated checksum, the updated firmware and/or software program may be considered validated in block 624. If the received checksum is not equal to the calculated checksum, the dynamic transaction card may transmit an alert to an associated mobile device and/or the firmware and/or software provider in block 622. This alert may trigger a backend action such as a deactivation of the dynamic transaction card, a hold on the dynamic transaction card, the transmission of a message to a user device and/or the dynamic transaction card (via the user device and/or a terminal), and/or logging the backend action in response to the alert.

Once an update is validated, a bootloader on the dynamic transaction card may execute the updates firmware and/or software in block 626. For example, a bootloader on the dynamic transaction card may receive a boot signal from a device, such as a the associated mobile device and/or a secure terminal, use the bootloader signal to validate the bootloader and determine whether the existing firmware and/or software is valid, load the updated firmware and/or software program, and execute the updated firmware and/or software program, which overwrites the existing firmware and/or software.

A status of the update procedure may be logged on the dynamic transaction card, a user device (once the status is transmitted from the dynamic transaction card to the user device), and/or a backend system via a user device connection (e.g., financial institution, firmware/software provider system, and/or the like) in block 628. At block 630, the method may end.

Figure 7:
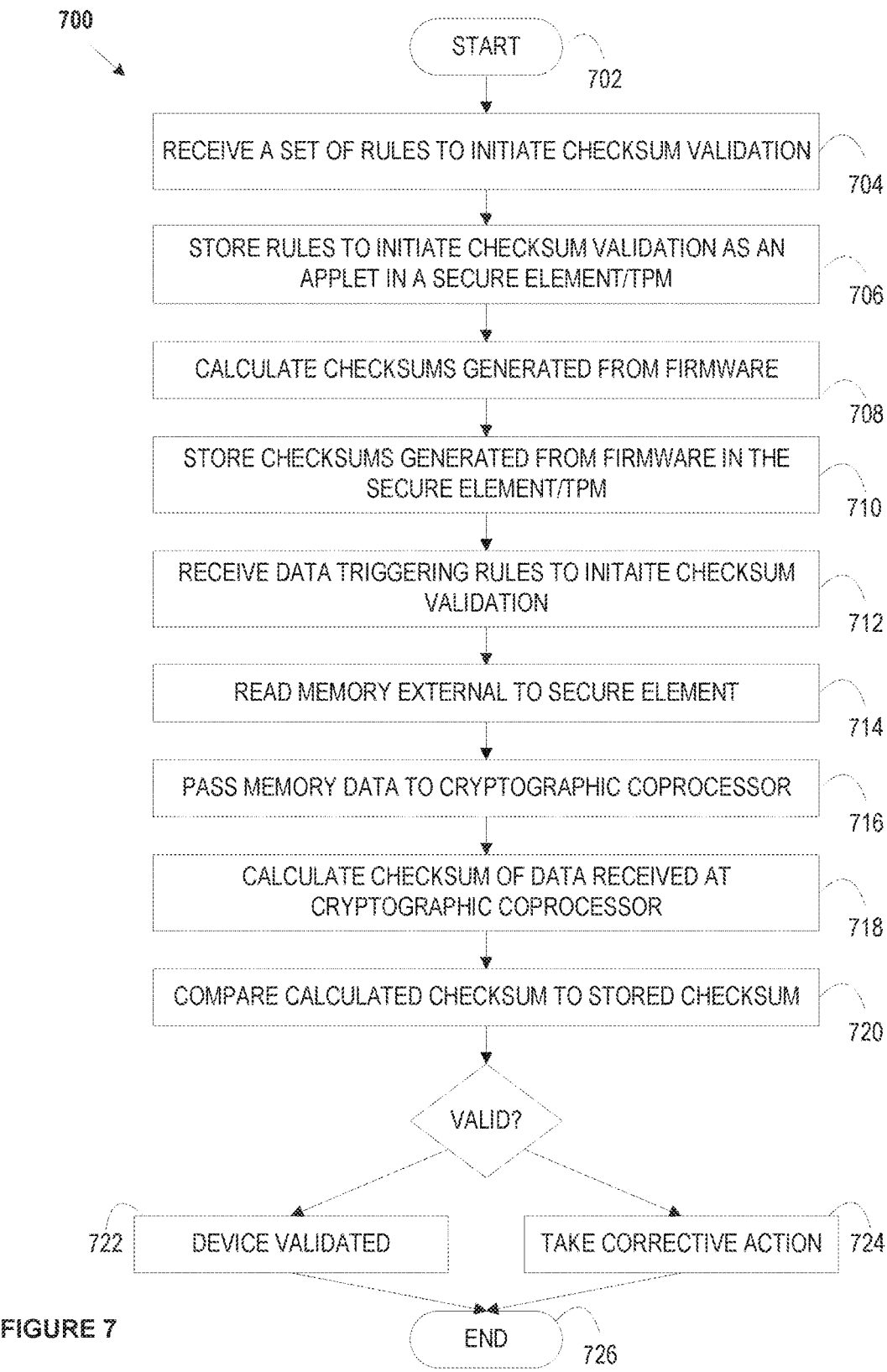
FIG. 7 depicts an example method using an EMV chip as a TPM in order to store and calculate checksums for firmware and/or application validation, according to embodiments of the disclosure.

Validation of firmware and/or software of an electronic device, such as device 120, card 200, and/or card 300, may occur using the method 700 described in FIG. 7. For example, validation may start at block 702.

At block 704, an electronic device may receive a set of rules to initiate checksum validation. These rules may be stored in block 706 in a secure element, such as a TPM and/or EMV chip acting as a TPM. A set of rules may include rules to determine when to perform checksum validation. For example, checksum validation may be time-driven and/or event-driven. Where an electronic device is a dynamic transaction card such as dynamic transaction card 120, 200, 300, events that may initiate checksum validation of the firmware and/or software stored on the dynamic transaction card may include at each transaction, at transactions over a predefined threshold, upon powering up of the dynamic transaction card, upon waking of the dynamic transaction card, upon receiving a wireless transmission at a dynamic transaction card (e.g., via Bluetooth, BLE, RFID, NFC, and/or WiFi), upon request from the card holder, and/or upon request from the card issuer. Such as, for example, as depicted in FIG. 8.

Figure 8:
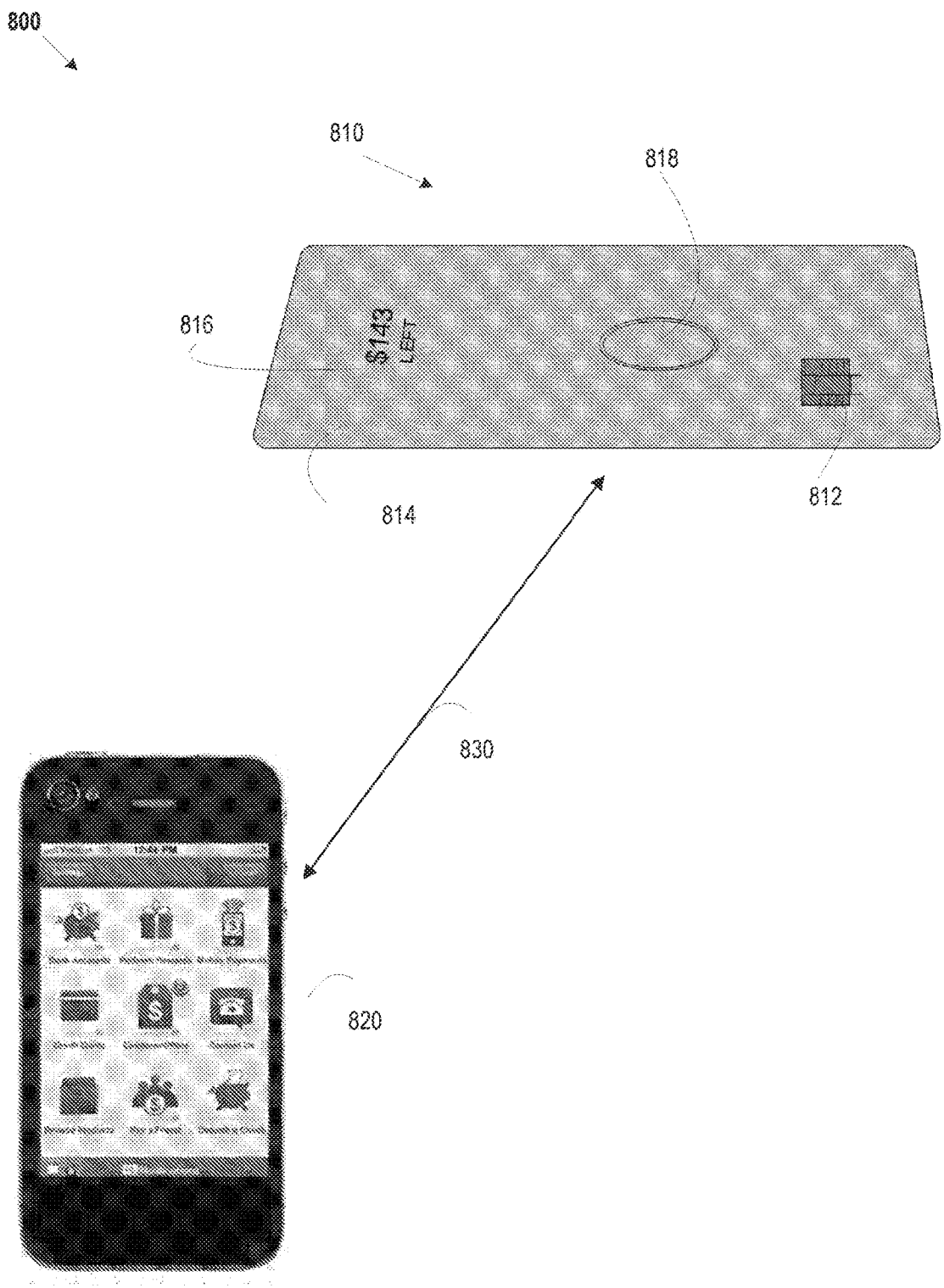
FIG. 8 depicts an example device with an EMV chip as a TPM in order to store and calculate checksums for firmware and/or application validation, according to embodiments of the disclosure.

For example, FIG. 8, which illustrates an example device 810 with an EMV chip 812 as a TPM in order to store and calculate checksums for firmware and/or application validation, may initiate checksum based on a number of input received at device 810. As described above, checksum calculation may be initiated upon receiving a wireless transmission at a dynamic transaction card, such as a transmission received from a mobile device 820 over a network 830. This transmission may be received via antenna 814. Data may be received and/or transmitted using, for example an application that maintains and/or creates a secure connection with a firmware and/or software provider, such as a financial institution. As described above, checksum calculation may be initiated upon powering up or waking of the device 810 via, for example, a sensor 818, or upon input via a sensor 818.

At block 708, checksums may be calculated for firmware and/or software on the electronic device. A checksum may be calculated using a number of checksum algorithms. These checksums may be calculated upon loading the firmware and/or software. The firmware and/or software may be loaded by a firmware and/or software provider and/or an electronic device manufacturer.

At block 710, the checksums may be calculated and transmitted for each software program to be loaded onto a dynamic transaction card. A checksum may be transmitted to the EMV chip and may be stored in a secure element (e.g., TPM, EMV chip, and/or the like as described herein) of the electronic device as. In this manner, the checksums may not be altered once the electronic device is released from the firmware and; or software provider and/or device manufacturer. At block 712, the electronic device may receive data triggering the stored rules to perform a checksum validation for the electronic device's firmware and/or software. Trigger data may include a time if the rules stored in block 706 indicate a time-based rule that initiates checksum validation. Trigger data may include a particular event as described above if the rules stored in block 706 indicate an event-based rule that initiates checksum validation.

Checksum validation may then begin in block 714 where memory including the firmware and/or software to be validated (e.g., memory• external to the secure element) is read by the secure element. By reading the memory, the secure element may determine memory data (e.g., bytes, words, and/or the like) associated with the memory. In block 716, this memory data may be passed to a cryptographic coprocessor in the secure element. A cryptographic coprocessor may then calculate a checksum for the received memory data at block 718. A checksum may be calculated (in block 718 and block 708) using a number of checksum algorithms. For example, a checksum may be calculating using a longitudinal parity check, a modular sum, Fletcher's checksum, Adler-32, cyclic redundancy checks, and/or the like.

At block 720 the calculated checksum may be compared to the stored checksum in order to validate the firmware and/or software stored on the electronic device. This comparison may take place using the secure element. If the comparison indicates that the checksums match, the firmware and/or software may be validated at block 722. This validation may be stored as validation data within the secure element. Validation data may also be transmitted to an external device and/or system, such firmware/software provider system 130, third party system 150, and/or mobile device 140.

If the checksums do not match, the secure element may instruct the electronic device to take a corrective action and/or the secure element may execute a corrective action itself at block 724. A corrective action may include zeroing, wiping, or deactivating the electronic device. Zeroing, wiping, and/or deactivating a dynamic transaction card may be performed via an erase script to erase the entire or a portion of the memory of card 200, a script to sever a connection, and/or the like. A corrective action may include transmitting a notification to a firmware/software provider system, such as firmware/software provider system 130, a mobile device associated with the dynamic transaction card, such as mobile device 140, and/or a third party system (e.g., merchant system, fraud alert system, and/or the like), such as third party system 150. The method may end at block 726.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise, various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A method for validating a firmware program, the method comprising:
    storing, in memory of a transaction card, the firmware program;
    receiving, at a processor of the transaction card, one or more rules to initiate a checksum validation via an applet;
    reading, via the applet, the firmware program stored on the transaction card;
    calculating, via a cryptographic processor of the transaction card, a first checksum for the firmware program;
    receiving, at the processor, data triggering the one or more rules;
    reading, via a secure element, the memory including the firmware program to identify memory data in response to receiving the data triggering the one or more rules;
    transmitting, via the secure element, the memory data to the cryptographic processor;
    calculating, via the cryptographic processor, a second checksum for the firmware program;
    comparing, using the processor, the first checksum and the second checksum to determine if the first checksum and the second checksum match; and
    either:
        validating the firmware program in response to determining that the first checksum and the second checksum match;
        or
        deleting at least a portion of data in the memory in response to determining that the first checksum and the second checksum do not match.

2. The method of claim 1, wherein:
    the one or more rules comprise a first time-driven rule; and
    the data triggering the one or more rules comprises a time in which to read the memory to identify the memory data.

3. The method of claim 1, wherein:
    the one or more rules comprise a first event-driven rule; and
    the data triggering the one or more rules comprises data indicating at least one of:
        a first initiation of a first transaction;
        a second initiation of a second transaction over a predefined monetary threshold;
        a waking of the transaction card from a sleep mode; and
        a connection attempt, via an antenna, to an external device.

4. The method of claim 3, wherein the data triggering the one or more rules is received from a point of sale device in communication with the processor.

5. The method of claim 4, further comprising receiving power to power the processor from the point of sale device.

6. The method claim 5, wherein the waking of the transaction card from the sleep mode is performed in response to receiving the power from the point of sale device.

7. The method of claim 4, further comprising connecting, via an antenna, to the point of sale device via a contactless connection.

8. The method of claim 1, further comprising storing the first checksum in the secure element such that the first checksum is protected from alteration once calculated.

9. The method of claim 1, further comprising receiving the firmware program via a secure connection with a financial institution.

10. A method for validating firmware programs, the method comprising:
    storing, in a secure element of a transaction card, an existing firmware program for the transaction card;
    storing, in the secure element, a first checksum calculated via a cryptographic processor of the transaction card using the existing firmware program upon loading of the existing firmware program;
    receiving, at an input/output interface, an updated firmware program from a firmware provider system;
    receiving, at a processor of the transaction card, a trigger that triggers checksum validation;
    reading, via the processor, the secure element to identify the first checksum;
    transmitting, via the secure element, the updated firmware program to the cryptographic processor;
    calculating, via the cryptographic processor, a second checksum for the updated firmware program;
    comparing, via the processor, the first checksum and the second checksum to determine if the first checksum and the second checksum match; and
    either:
        executing the updated firmware program in response to determining that the first checksum and the second checksum match;
        or
        triggering an alert in response to determining that the first checksum and the second checksum do not match.

11. The method of claim 10, wherein the updated firmware program is received from the firmware provider system during and/or at an end of a card transaction.

12. The method of claim 10, wherein the updated firmware program is received from a point of sale device in communication with the processor.

13. The method of claim 12, further comprising receiving power to power the processor from the point of sale device.

14. The method claim 13, further comprising waking, via the processor, the transaction card in response to receiving the power from the point of sale device.

15. The method of claim 12, further comprising connecting, via an antenna, to the point of sale device via a contactless connection.

16. The method of claim 10, wherein the alert causes the processor to execute an erase script to erase at least a portion of data in the secure element and/or deactivate the transaction card.

17. The method of claim 10, wherein the alert causes the processor to communicate with a financial institution to place a hold on an account associated with the transaction card.

18. The method of claim 10, wherein the alert causes the processor to transmit, via an antenna, a message to a paired user device.

19. The method of claim 10, wherein the updated firmware program is encrypted and comprises a first cryptographic key;

the method further comprising:
storing, in the secure element, a second cryptographic key; and
decrypting, via the processor, the updated firmware program using the second cryptographic key and the first cryptographic key.

20. The method of claim 10, further comprising receiving power to power the processor from a point of sale device.

* * * * *